US012656191B2

(12) United States Patent
Falco et al.

(10) Patent No.: US 12,656,191 B2
(45) Date of Patent: Jun. 16, 2026

(54) FLUID FLOW SENSOR

(71) Applicant: FLUSSO LIMITED, Cambridge (GB)

(72) Inventors: Claudio Falco, Cambridge (GB); Syed Zeeshan Ali, Cambridge (GB)

(73) Assignee: FLUSSO LIMITED, Cambridge (GB)

( * ) Notice: Subject to any disclaimer, the term of this patent is extended or adjusted under 35 U.S.C. 154(b) by 498 days.

(21) Appl. No.: 18/055,548

(22) Filed: Nov. 15, 2022

(65) Prior Publication Data

US 2024/0159602 A1 May 16, 2024

(51) Int. Cl.
| | |
|---|---|
| *G01K 13/02* | (2021.01) |
| *G01K 7/02* | (2021.01) |
| *G01K 7/16* | (2006.01) |
| *G01P 5/10* | (2006.01) |
| *G01P 13/02* | (2006.01) |

(52) U.S. Cl.
CPC ............. *G01K 13/026* (2021.01); *G01K 7/02* (2013.01); *G01K 7/16* (2013.01); *G01P 5/10* (2013.01); *G01P 13/02* (2013.01)

(58) Field of Classification Search
CPC .......... G01K 13/026; G01K 7/02; G01K 7/16; G01P 5/10; G01P 13/02
USPC ...................................................... 73/170.12
See application file for complete search history.

(56) References Cited

U.S. PATENT DOCUMENTS

| | | | | |
|---|---|---|---|---|
| 4,885,937 | A * | 12/1989 | Tanaka ..................... | G01F 1/699 73/170.12 |
| 6,494,090 | B1 | 12/2002 | Loesing et al. | |
| 6,862,930 | B1 * | 3/2005 | Kohno ..................... | G01F 1/699 73/204.26 |
| 7,296,465 | B2 | 11/2007 | Ding et al. | |
| 7,644,612 | B2 | 1/2010 | Schrag et al. | |
| 8,356,514 | B2 | 1/2013 | Wang et al. | |
| 9,366,557 | B2 * | 6/2016 | Soreefan ................... | G01F 1/68 |
| 9,635,886 | B2 | 5/2017 | Tu | |
| 10,905,162 | B2 * | 2/2021 | Alarcon ................ | A61M 15/06 |
| 2009/0133490 | A1 * | 5/2009 | Zschernack ............. | G01F 1/684 73/204.27 |

FOREIGN PATENT DOCUMENTS

DE          4208137 A1          9/1993

OTHER PUBLICATIONS

LU503058, "Search Report and Written Opinion", Issued in related case, 9 pages.

* cited by examiner

*Primary Examiner* — Nathaniel T Woodward
(74) *Attorney, Agent, or Firm* — FisherBroyles, LLP

(57) ABSTRACT

A sensor for sensing direction of fluid-flow, the sensor comprising: a heating element; a first active temperature sensing element; and a processor; wherein the processor is configured to: receive a first signal corresponding to a first sensed temperature from the first active temperature sensing element; and determine a direction of fluid-flow based on a difference between the first sensed temperature and a threshold value. A method for sensing direction of fluid-flow and a method for manufacturing a sensor are also described.

19 Claims, 19 Drawing Sheets

Figure 18:
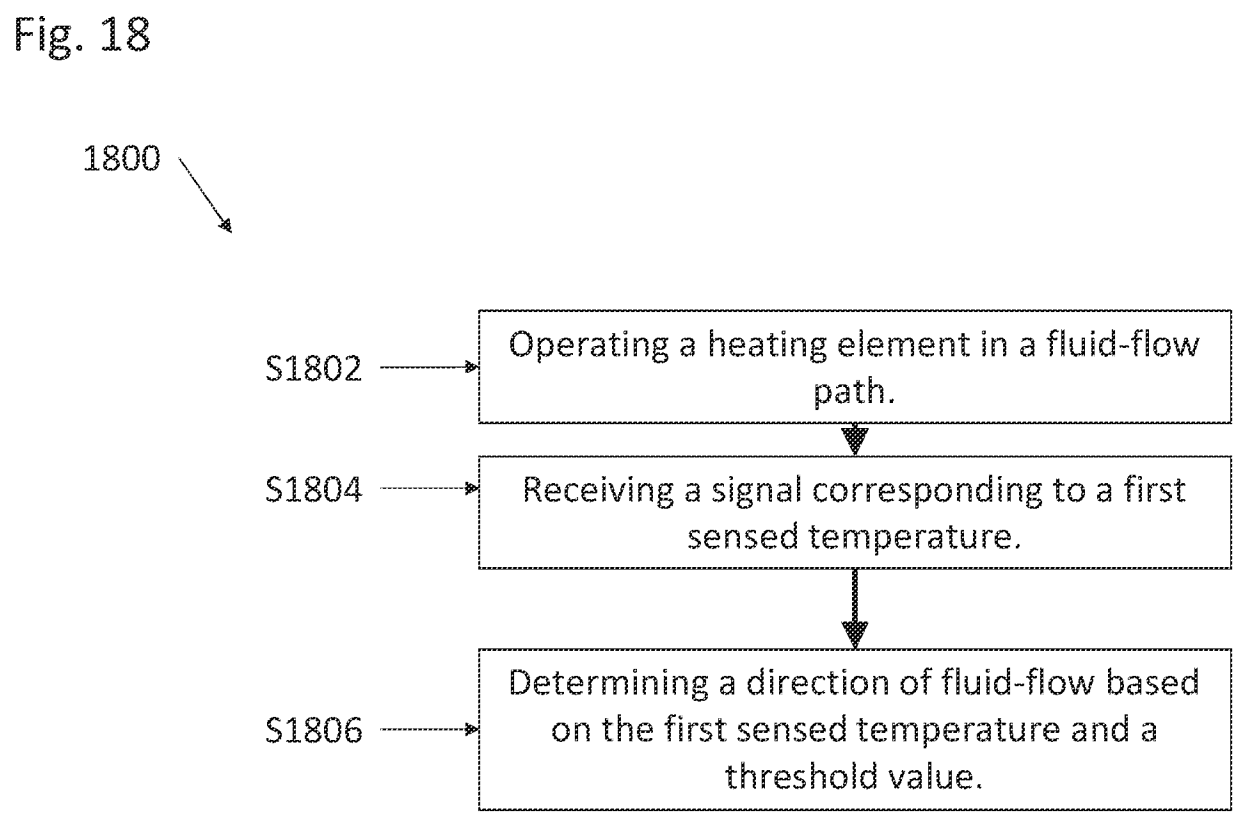

S1802 ········ Operating a heating element in a fluid-flow path.

S1804 ········ Receiving a signal corresponding to a first sensed temperature.

S1806 ········ Determining a direction of fluid-flow based on the first sensed temperature and a threshold value.

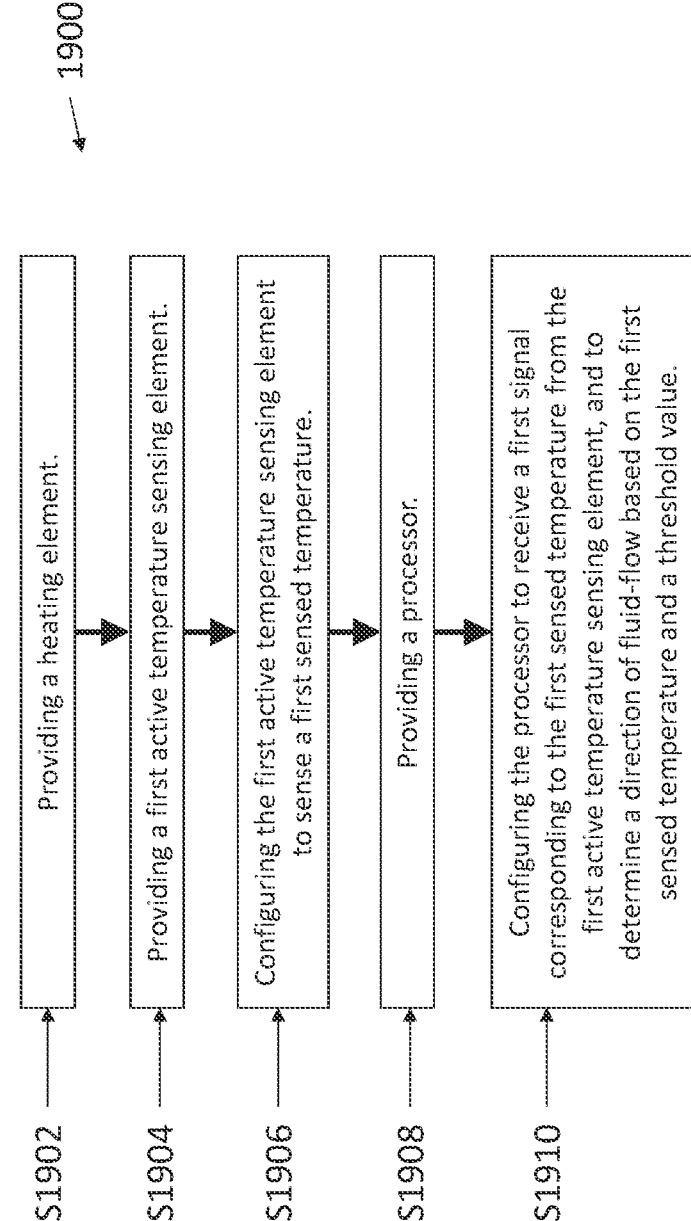

S1902 — Providing a heating element.

S1904 — Providing a first active temperature sensing element.

S1906 — Configuring the first active temperature sensing element to sense a first sensed temperature.

S1908 — Providing a processor.

S1910 — Configuring the processor to receive a first signal corresponding to the first sensed temperature from the first active temperature sensing element, and to determine a direction of fluid-flow based on the first sensed temperature and a threshold value.

FLUID FLOW SENSOR

TECHNICAL FIELD

The present disclosure relates to a sensor for sensing direction of fluid-flow.

BACKGROUND

Thermal fluid-flow sensors utilise the thermal interaction between the sensor itself and the fluid. Depending upon the physical phenomena governing the interaction, flow sensors can be classified into the following three categories:
(i) anemometric sensors that measure the convective heat transfer induced by fluid-flow passing over a heated element;
(ii) calorimetric sensors that detect the asymmetry of the temperature profile generated by a heated element and caused by the forced convection of the fluid-flow; and
(iii) time of flight (ToF) sensors that measure the time elapsed between the application and the sensing of a heat pulse.

Standard calorimetric devices use a differential signal between two wires on opposite sides of a heating element to determine the flow direction. However, geometrical mismatches and asymmetries in the membrane can limit the detection capabilities of such devices at low flow. The idea presented here suggests to compare the output signal with a threshold obtained from the same element and removes this source of uncertainty, improving the limit of detection.

Some examples of the mentioned structures can be found in: U.S. Pat. No. 7,296,465 B2, U.S. Pat. No. 9,635,886 B2, U.S. Pat. No. 6,494,090 B1, and U.S. Pat. No. 7,644,612 B2.

SUMMARY

Present temperature based anemometric devices detect the flow magnitude, or intensity, by measuring the change in power or temperature in a heated element by comparing the output signal with the response in no flow (stored from calibration). The main drawback of such configuration is that the heating and sensing element coincide, so no information can be extracted on the flow direction.

Calorimetric detectors, instead, use three elements, the central one of which is heated and the other two are compared. A flow moving on the device causes an asymmetry in the temperature profile that causes an imbalanced response from the side elements. The difference signal is then amplified and used to detect flow intensity and/or direction. The need for a sensing element on either side of the heater to compare limits the sensitivity range of the device.

The measuring methodology of the present disclosure uses the advantages of both methods:
Having a sensing element separate from the heater allows to infer the flow direction;
Comparing to a calibration value, dependent on other variables such as ambient temperature, can extend the device detection range.

Aspects and preferred features are set out in the accompanying claims.

Described herein is a sensor for sensing direction of fluid-flow, the sensor comprising: a heating element; a first active temperature sensing element; and a processor. The processor may be configured to: receive a first signal corresponding to a first sensed temperature from the first active temperature sensing element; and determine a direction of fluid-flow based on the first signal corresponding to the first sensed temperature and a threshold value.

The threshold value may correspond to a threshold temperature.

In some examples, the threshold value comprises a temperature.

In some examples, the threshold value comprises a voltage, a current, and/or a power.

For example, the direction of fluid-flow can be determined based on a difference between the first sensed temperature and the threshold value.

Advantageously, in contrast to, e.g., calorimetric devices, a sensor according to the present disclosure enables determination of the flow direction based on a reading from a single active temperature sensor, resulting in a simplified device.

Further advantageously, a sensor according to the present disclosure employs a temperature sensing element that is separate from the heating element, meaning that in addition to determining a magnitude of fluid-flow based on a signal from the heater (in examples in which the sensor may also be configured to determine magnitude of fluid-flow), the direction of fluid-flow can also be determined by use of the temperature sensing element.

The heating element may be configured such that a fluid flows past the heating element (e.g. in use). The fluid may flow through, over, under, in, and/or on the sensor.

The direction of the fluid-flow may correspond to the sign (i.e. positive or negative) of the difference between the first sensed temperature and the corresponding threshold value.

The first and/or the second temperature sensing element may comprise a resistor.

The first and/or second active temperature sensing element may comprise a thermopile.

The processor, also referred to herein as circuitry, may carry out instructions provided on a non-transitory computer readable storage medium.

The instructions may be provided on one or more carriers. For example there may be one or more non-transient memories, e.g. a EEPROM (e.g. a flash memory) a disk, CD- or DVD-ROM, programmed memory such as read-only memory (e.g. for Firmware), one or more transient memories (e.g. RAM), and/or a data carrier(s) such as an optical or electrical signal carrier. The memory/memories may be integrated into a corresponding processing device and/or may be separate to the processing device. Code (and/or data) to implement embodiments of the present disclosure may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language.

The processor may be configured to receive and/or determine the threshold value(s).

In some examples, the processor may comprise analogue and/or digital circuitry.

In some examples, the processor is "on-chip" (i.e. located on the sensor). In other examples, the processor is not on-chip.

In some examples, the processor is further configured to receive a third signal from the heating element. The processor may be configured to determine a magnitude of fluid-flow based on the third signal (e.g. by an anemometric method).

In some examples, the sensor further comprises a second active temperature sensing element. The processor may be further configured to: receive a second sensed temperature from the second active temperature sensing element; and determine the direction of fluid-flow based additionally on the second sensed temperature.

It will be appreciated that the second active temperature sensing element is independent of the first temperature sensing element. That is, each of the first and second temperature sensing elements can be used to determine the direction of fluid-flow independently of one another.

Advantageously, the inclusion of a second active temperature sensing element can extend the working, or dynamic, range of the sensor. The first and second temperature sensing elements may be situated at different distances from the heating element. For example, the temperature sensing element that is closer to the heating element may be more sensitive at low flow rates than the temperature sensing element that is further from the heating element, while the temperature sensing element that is further from the heating element may be more sensitive at high flow rates than the temperature sensing element that is closer to the heating element.

In some examples, the processor is further configured to determine the magnitude and/or direction of fluid-flow based on: a difference between the second sensed temperature and a second threshold value.

The second threshold value may correspond to a second threshold temperature.

In some examples, the second threshold value comprises a temperature.

In some examples, the second threshold value comprises a voltage, a current, and/or a power.

When there is more than one threshold value (e.g. threshold value and second threshold value), the threshold values may be the same. In some examples, the threshold values (threshold value and second threshold value) are different, in particular in examples where the first and second temperature sensing elements are situated at different distances from the heating element.

The magnitude of the fluid-flow may correspond to the magnitude of the difference between the first and/or second sensed temperature(s) and the corresponding threshold value. The direction of the fluid-flow may correspond to the sign (i.e. positive or negative) of the difference.

The threshold value may be determined based on an ambient temperature.

In some examples, the threshold value(s) is/are determined based on a calibration between the ambient temperature and the temperature sensed by the first and/or second active temperature sensing element.

In some examples, the processor comprises a memory (e.g. a non-transient memory), and the threshold value(s), and/or any calibration data, may be stored in the memory. The stored threshold value(s) and/or calibration data may be modified as part of a calibration process.

The sensor may additionally comprise an ambient temperature sensing element, the ambient temperature sensing element being configured to detect the ambient temperature. The processor may be further configured to determine the threshold value(s) based on the ambient temperature.

Preferably, the ambient temperature sensing element is thermally decoupled from the heating element. For example, the ambient temperature sensing element may be spatially separated from the heating element. In some examples, the ambient temperature sensing element is spatially separated from the heating element by a larger amount than a spatial separation between the active temperature sensing element (s) and the heating element.

In some examples, the ambient temperature sensing element is thermally isolated from the heating element.

Also described herein is a sensor for sensing magnitude and/or direction of fluid-flow, the sensor comprising: a semiconductor substrate comprising an etched portion; a dielectric region located on the semiconductor substrate, the dielectric region comprising a dielectric membrane located over the etched portion of the semiconductor substrate; and a heating element located within the dielectric membrane.

In some examples, the sensor comprises a first active temperature sensing element located on the dielectric membrane. In some examples, the sensor comprises a first active temperature sensing element located within the dielectric membrane. The first active temperature sensing element may be spatially separated from the heating element.

In some examples, the sensor comprises a second active temperature sensing element located on the dielectric membrane. In some examples, the sensor comprises a second active temperature sensing element located within the dielectric membrane. The second active temperature sensing element may be spatially separated from the heating element.

As discussed above, a sensor according to the present disclosure may comprise an ambient temperature sensing element.

In some examples, the ambient temperature sensing element is thermally decoupled from the heating element by being located outside of the dielectric membrane. For example, the ambient temperature sensing element may be located in the vicinity of the unetched semiconductor substrate (e.g. on or above the semiconductor substrate).

In some examples, the ambient temperature sensing element is located within the dielectric membrane, but is thermally isolated or insulated from the heating element. For example, the ambient temperature sensing element may be thermally insulated, or isolated, from the heating element by one or more recessed regions of the dielectric membrane.

Thermally decoupling the ambient temperature sensing element from the heating element, e.g. to prevent heating of the ambient temperature sensor by the heating element, may improve the accuracy of the sensor.

The dielectric region may comprise a dielectric layer or a plurality of layers including at least one dielectric layer. The dielectric region may comprise layers of more than one material, such as silicon dioxide, silicon nitride, or aluminium oxide. The heating element may be fully embedded or partially embedded within the dielectric membrane.

The membrane may also comprise one or more layers of spin on glass, and a passivation layer over the one or more dielectric layers. The employment of materials with low thermal conductivity (e.g. dielectrics) enables a significant reduction in power dissipation as well as an increase in the temperature gradients within the membrane with direct benefits in terms of sensor performance (e.g. sensitivity, frequency response, range, etc.). Temperature sensing elements or heaters made of materials such as monocrystalline or polycrystalline semiconductors or metals could be suspended or embedded in the dielectric membrane.

The dielectric membrane may also have other structures made of metal or other conductive or other materials with higher mechanical strength. These structures can be embedded within the membrane, or may be above or below the membrane, to engineer the thermo-mechanical properties (e.g. stiffness, temperature profile distribution, etc.) of the membrane and/or the fluid dynamic interaction between the fluid and the membrane. More generally, these structures can be also outside the membrane and/or bridging between inside and outside the membrane.

Generally speaking, a dielectric membrane region may be located immediately adjacent or above (or below if a flip-chip technology is used) to the etched portion of the sub-strate. The dielectric membrane region corresponds to the area of the dielectric region directly above or below the etched cavity portion of the substrate. Each dielectric mem-brane region may be over a single etched portion of the semiconductor substrate. The membrane maybe a "closed membrane", supported by the substrate along its entire perimeter, or can be a bridge type structure—supported by a number of dielectric beams.

During operation of the heating element, the heat gener-ated by the heater diffuses into the dielectric membrane, above and below the dielectric membrane, and into the fluid surrounding the heating element. The presence of flow above the membrane causes the heat generated to move downstream from the heater, resulting in a stronger cooling effect on the upstream side.

In examples where the sensor comprises first and second active temperature sensing elements, the first and second active temperature sensing elements may be disposed on opposite sides of the heating element.

Some additional examples will now be described. It will be appreciated that the sensor according to the present disclosure may also be referred to as a "device", or a "chip".

The device may comprise at least one ambient tempera-ture sensing element wherein the ambient temperature sen-sor is located outside of the dielectric membrane and over the semiconductor substrate, or wherein the ambient tem-perature sensing element is located on or within the dielec-tric membrane and wherein the fluid sensor comprises at least one recessed region within the dielectric membrane configured to thermally isolate the heating element from the first temperature sensing element.

The ambient temperature sensing element may be outside the membrane, or within the dielectric membrane and ther-mally isolated from the heating element. Therefore, the temperature of the ambient temperature sensing element will remain at ambient or room temperature or at a significantly colder temperature than that of the heating element, whereas the active temperature sensing element is on the same dielectric membrane as the heating element and reaches a temperature closer to the heater one than to ambient tem-perature.

During operation of the heating element, the heat gener-ated by the heater may diffuse into the dielectric membrane, above and below the dielectric membrane, and into the fluid surrounding the heating element. The presence of flow above the membrane causes the heat generated to move downstream from the heater, resulting in a stronger cooling effect on the upstream side.

When the heating element is run at constant resistance, the presence of a flow may increase the temperature in the region immediately after the heating element while the area before is cooled via forced convection. Using the signal from the ambient temperature sensing element, it is possible to evaluate a threshold value for the active temperature sensor and, by comparing it to the actual output it is possible to extract not only the flow direction (from the sign) but also the intensity/speed based on how far from the threshold the signal is. The speed of flow can also be determined by the extra power required by the heater to maintain the constant resistance.

When the heater is biased in a different mode (e.g. constant current or constant power), an anemometric approach may be used to evaluate the flow properties from the heater response, while the ambient temperature sensing element may be used to evaluate a threshold value to compare with the active temperature sensing element mea-sured output. A signal higher than the threshold can mean that the sensor is downstream from the heater, while a lower value may correspond to a flow encountering the sensing element before the heater.

The heating element and all the temperature sensing elements may operate as a resistive temperature detector, where the temperature sensing elements have the same geometry with a cold resistance equivalent or higher than the heating element. The heating element can be driven in a constant temperature, constant current, constant voltage or constant resistance mode, with the threshold values depend-ing on the driving mode of choice. The active and ambient temperature sensing element can be driven in constant current or constant voltage, with a signal small enough to cause negligible self-heating that would introduce an error in the detection.

The heating element may operate simultaneously as both a heating element and a sensing element. The heating and the sensing elements can be considered as electrically equiva-lent to a resistor. The electrical conductivity of most heaters materials (Tungsten, Titanium, Platinum, Aluminium, poly-silicon, monocrystalline silicon) varies with temperature. This variation is mostly linear and is characterised by the TCR (Temperature coefficient of resistance). The TCR can be positive or negative, but most metals have a positive and stable TCR, meaning that their resistance increases when the temperature is increased. The advantage of this embodiment is simplicity and reduced number of additional elements on the membrane. The larger the number of elements on the dielectric membrane, the higher the probability of impaired reliability or malfunction of the sensor.

By providing the ambient temperature sensing element on the substrate or on the same membrane and thermally isolated (i.e. not on a separate membrane), the ambient temperature sensing element may allow more accurate deter-mination of the direction of flow instead of just using the reading from the active temperature sensor.

According to a further aspect of the disclosure, there is provided a fluid sensor for sensing intensity and direction of the flow, the sensor comprising: a semiconductor substrate comprising a first etched portion; a dielectric region located on the semiconductor substrate, wherein the dielectric region comprises a first dielectric membrane located over the first etched portion of the semiconductor substrate; a heating element located within the first dielectric membrane; an ambient temperature sensing element spatially separated from the heating element, wherein the ambient temperature sensing element is located outside of the first dielectric membrane and over the semiconductor substrate, or wherein the ambient temperature sensing element is located on or within the first dielectric membrane and wherein the fluid sensor comprises at least one recessed region within the first dielectric membrane configured to thermally isolate the heating element from the ambient temperature sensing ele-ment; and a first and second active temperature sensing elements located on or within the first dielectric membrane, wherein the first and second active temperature sensing elements are substantially identical in shape and size to the ambient temperature sensing element, and wherein the ambient temperature sensing element is located a first dis-tance away from the heating element, and wherein the first and second active temperature sensing elements are located a distance from the heating element smaller than the first distance, and wherein the first and second active temperature sensing elements are on opposite sides of the heating element.

The fluid sensor may comprise a semiconductor substrate made of a semiconductor material such as silicon, silicon carbide or Gallium Nitride, and comprising an etched portion. The fluid sensor may also comprise a dielectric region comprising of oxides and/or nitrides such as silicon dioxide and silicon nitride, where the portion of the dielectric region adjacent to the etched portion is referred to as a dielectric membrane. The dielectric membrane may have embedded structures made of semiconductor material or metal structures.

The semiconductor substrate may be any semiconductor such as silicon, silicon on insulator (SOI), Silicon Carbide, Gallium Nitride or Diamond. In particular, the use of silicon is advantageous, as it guarantees sensor manufacturability in high volume, low cost and high reproducibility. The use of a silicon substrate could also enable on-chip circuitry for sensor performance enhancement and system integration facilitation. Such on-chip circuitry could be implemented by using analogue or digital or mixed-signal blocks placed outside the dielectric membrane.

The dielectric membrane or multiple dielectric membranes may be formed by back-etching using Deep Reactive Ion Etching (DRIE) of the substrate, which results in vertical sidewalls and thus enabling a reduction in sensor size and costs. However, the back-etching can also be done by using anisotropic etching such as KOH (Potassium Hydroxide) or TMAH (TetraMethyl Ammonium Hydroxide) which results in sloping sidewalls. The dielectric layers within the membrane which could be formed by oxidation or oxide deposition could be used as an etch stop during the DRIE or wet etching processes. The membrane can also be formed by a front-side etch (using most commonly wet etch techniques) or a combination of a front-side and back-side etch to result in a suspended membrane structure, supported only by two or more beams. The membrane may be circular, rectangular, or rectangular shaped with rounded corners to reduce the stresses in the corners, but other shapes are possible as well.

Preferably, the semiconductor substrate may be silicon and the dielectric membrane may be formed mainly of oxide and nitride materials, or oxinitride (a pre-formed combination of oxide and nitride) and where the heater element may be made of a metal such as tungsten, titanium, copper, aluminium, gold, platinum or a combination of those or a semiconductor such as highly doped n type or p type silicon or polysilicon. The heater may have a shape of a meander, spiral or a hotwire.

The heating element may be used in an anemometric mode to detect the flow intensity, while the ambient temperature sensing element may provide the value of ambient temperature and, based on the flow intensity and the ambient temperature, a separate threshold may be evaluated for the first and second active sensing elements separately and compared with the output signal coming from the sensing elements. The sensing element downstream from the heater will show a signal higher than the corresponding threshold while the other will have a signal below its threshold.

If the distance of the heating element from first and second active sensing element is the same, the additional information can be used to increase the confidence in the measured result lowering the limit of detection for the structure. The two sensing elements can also be placed at different distances from the heater, where in this case the sensing element closer to the heater is most sensitive at low flow rates while the one further has most sensitivity at higher flow increasing the device dynamic range The processing required to bias the circuit, read the signal and process it to extract flow properties and direction can be included on the same substrate as the sensor, in a separate substrate or in a microcontroller connected to the sensing device via a custom made PCB.

The ambient temperature sensing element may be located a first distance away from the heating element, and the first active temperature sensing element may be located a second distance away from the heating element, and the second active temperature sensing element may be located a third distance away from the heating element. The first distance may be greater than the second and third distance.

The first and second active temperature sensing elements may be located closer to the heating element than the ambient temperature sensing element. The exact location of the first and second active temperature sensing elements depend on the application range of the sensor, where smaller distances are more effective for slow flows whereas a greater distance is advantageous for fast flows.

The threshold values and the output signal from the first and second active temperature sensing elements can be any of current, voltage, power or resistance.

The value of the resistance of, current through, or voltage across the resistive temperature detector can be measured and compared to a threshold value to detect the flow properties. If the flow intensity above the sensor changes, the convective heat losses also change and this will change the biasing conditions of the heater, as well as changing the temperature in the active temperature detector causing a change in its resistance. The two signals could be measured as a resistance change, voltage change, current change or power change.

Changes in ambient temperature affect the temperature distribution around the heater, hence the temperature seen by the active temperature sensing element for the same flow speed and direction. For this reason, an additional temperature sensor non-thermally coupled with the heater may be included in the structure to monitor the ambient temperature, and the threshold value used for the comparison may be a function of said ambient temperature.

The ambient temperature sensing element and the active temperature sensing element may be both located on or within the first dielectric membrane, and the fluid sensor may comprise at least one recessed region within the first dielectric membrane configured to thermally isolate the heating element and the active temperature sensing element from the ambient temperature sensing element.

The active temperature sensor element may be laterally spaced to the heating element, and can be made of the same material layer as the heating element. Alternatively, the active temperature sensing element can be made of a different material layer than the heater. The distance between heating and sensing element depends on the range of flow the sensor is designed to cover, with smaller distance being more sensitive at slow flows and greater distances having higher sensitivity at large flow speed. A second active sensing element can be added on the opposite side of the heater from the first active sensing element, at a different distance from the heating element to extend the sensor working range.

The two temperature resistive detectors can be identical in size, shape and resistance. Alternatively, the ambient temperature sensing element may be configured to have a higher resistance at room temperature than a resistance of the active temperature sensing element at room temperature, and the ambient temperature sensing element and the active temperature sensing element may be configured to have substantially the same resistance at an operating temperature of the sensor without any flow present.

The semiconductor substrate may comprise an additional etched portion, and the dielectric layer may comprise an additional dielectric membrane located over the additional etched portion of the semiconductor substrate. The sensor further may comprise an additional heating element located within the additional dielectric membrane and an additional ambient temperature sensing element and an additional active temperature sensing element.

The heating element may be a resistive heating element. At least one of the ambient temperature and active temperature sensing elements may be a resistive temperature sensing elements, also known as resistive temperature detectors (RTDs).

The resistive temperature detector elements may comprise metal (Tungsten, Al, Copper, Platinum, Gold, Titanium) or semiconductor material (Silicon, Polysilicon, Silicon Carbide, Gallium Nitride, Aluminium Gallium Nitride, or Gallium Arsenide or a two dimensional electron gas)

Firstly, for increased sensitivity and stability, such resistive temperature detectors may have a high, reproducible and stable TCR (Temperature Coefficient of Resistance). Secondly, it is preferable that such resistive temperature detectors are linear in temperature (i.e. their resistance varies linearly with the temperature).

The sensing elements may be temperature sensitive and may be any of resistive temperature detectors, diodes, transistors or thermopiles, or an array in series or parallel or a combination of those.

Such sensors can be implemented in bulk CMOS, SOI (Silicon on Insulator) CMOS technology. SOI membranes can be made by using the buried oxide as an etch stop. SOI diodes, transistors and thermopiles can be made by using the thin silicon layer above the buried oxide which can be doped n or p-type.

One type of sensing element may be used or a combination of different types of sensing elements may be used.

A thermopile comprises one or more thermocouples connected in series. Each thermocouple may comprise two dissimilar materials which form a junction at a first region of the membrane, while the other ends of the materials form a junction at a second region of the membrane or in the heat sink region (substrate outside the membrane area), where they are connected electrically to the adjacent thermocouple or to pads for external readout. The thermocouple materials may comprise a metal such as aluminium, tungsten, titanium or combination of those or any other metal available in the process. Alternatively, the thermocouple materials may comprise thermocouples based on n-type and p-type silicon or polysilicon or combinations of metals and semiconductors. The position of each junction of a thermocouple and the number and the shape of the thermocouples may be any required to adequately map the temperature profile distribution over the membrane to achieve a specific performance.

The sensitivity and selectivity to the flow intensity and direction may be enhanced by using extra sensing elements, symmetrical or asymmetrical recessed regions, and/or an additional heater.

The ambient temperature sensing element may be located above the semiconductor substrate. The ambient temperature sensing element may be directly above the semiconductor substrate, so that the ambient temperature sensing element is completely above a substrate portion of the substrate and is not above the etched region of the substrate and is not located within the dielectric membrane. This increases thermal isolation between the ambient temperature sensing element and the components within the dielectric membrane, therefore improve the sensitivity of the device.

The ambient temperature sensing element may be located within the dielectric region, but preferably outside the dielectric membrane area or at an edge of the membrane area.

Alternatively, the ambient temperature sensor could also be placed at the edge of the membrane region (in order for example to reduce the chip area).

The flow sensor may further comprise circuitry configured to determine the properties of the flow based on the output of the ambient temperature sensing element or the differential signal.

A control and measurement unit/circuitry that drives the heater in constant current, constant voltage or constant power mode may be provided. The driving could be preferably in pulse mode, but continuous mode or AC mode are also possible.

The processor, or circuitry, may be located on a same chip as the fluid sensor. Analogue/digital circuitry may be integrated on-chip. Circuitry may comprise IPTAT, VPTAT, amplifiers, analogue to digital converters, memories, RF communication circuits, timing blocks, filters or any other mean to drive the heating element, read out from the temperature sensing elements or electronically manipulate the sensor signals. For example, it is demonstrated that a heating element driven in constant temperature mode results in enhanced performance and having on-chip means to implement this driving method would result in a significant advancement of the state-of-the-art flow sensors. The driving method known a $3\omega$ may be implemented via on-chip means, or any other driving method, such as constant temperature difference and time of flight, needed to achieve specific performance (e.g. power dissipation, sensitivity, dynamic response, range, fluid property detection, etc.). In absence of on-chip circuitry, this disclosure also covers the off-chip implementation of such circuital blocks when applied to a flow sensor. Such off-chip implementation may be done in an ASIC or by discrete components, or a mix of the two.

The circuitry may comprise one or more of:

a constant current or constant resistor drive circuit, a constant current source, a Wheatstone bridge, an amplifier, an Analog to Digital convertor, a Digital to Analog Convertor, or a microcontroller.

Differential signals can be obtained by using a combination of current sources and differential amplifiers, bridge type circuits or other types of subtraction circuits or instrumentation amplifiers.

The ambient temperature sensing element and the active temperature sensing may be located on two sides of a bridge circuit (also referred to as an instrumentation bridge, and can be a Wheatstone bridge), and the sensor may be configured such that an output of the bridge circuit may be a function of the speed and direction of the fluid around the sensor. The output of the bridge circuit may therefore also be a function of the flow speed and direction.

The flow sensor may comprise at least one recessed region within the first dielectric membrane and between the heating element and the ambient temperature sensing element.

The recessed region may be located between the temperature sensing elements and the edge of the dielectric membrane, such that the recessed region strengthen the thermal coupling between the heating element and the temperature sensors. The recess area can be placed on only one side of the heater, as to create an asymmetry in the temperature profile.

The recessed region can, in alternative, be located between the heater and one or both sensing elements, so that the sensing element reaches a lower temperature for the same biasing conditions of the heater.

The recessed regions or discontinuities in the dielectric membrane provide an interruption (or partial interruption) in the thermal conduction path through the solid of the dielectric membrane. This strengthen or weakens the thermal coupling between the heater and the sensing elements, that in turn increases or decreases the temperature reached by the temperature sensor for the same heater biasing conditions. This difference determines the flow range at which the components are most sensitive to flow, so it can be used to extend the dynamic sensing range of the sensor.

The at least one recessed region may comprise one or more discontinuous regions where the thickness of the dielectric membrane is discontinuous or varies from an average or most common dielectric membrane thickness.

An edge of the dielectric membrane may refer to a perimeter edge of the dielectric membrane, in other words, the area where the dielectric membrane meets or joins the semiconductor substrate. The area of the dielectric region above the semiconductor substrate may refer to the area of the dielectric region outside the dielectric membrane.

The recessed regions may be holes (perforations) through the dielectric membrane. This may be advantageous, as the thermal conduction path through the solid of the dielectric membrane will be impeded and this will mean that the thermal conduction will occur through the holes (mainly via conduction) or above the holes (via both conduction and convection), thus facilitating the measurement of the flow properties.

There may be at least one hole through the membrane to connect the upper side of the membrane to the lower side of the membrane via the fluid to be sensed. The at least one hole may also disrupt the thermal conduction path through the solid dielectric membrane, forcing more heat to dissipate via convection and conduction through the environment. The presence of the at least one hole may also help to reduce the power consumption of the device (for the same heater temperature), because of the reduction in the heat conduction losses (through the solid membrane). Furthermore, the presence of the at least one hole may allow for a lower thermal mass of the membrane thus reducing the time needed for the heater to heat up and cool down.

The at least one hole or recessed region may be used to enhance the sensitivity to the flow properties or direction in the full range of detection or a portion of it.

The at least one recessed region may comprise one or more holes. The holes may refer to apertures, perforations or slots extending through an entire height or depth or thickness of the dielectric membrane. This forms a fluid flow path and provides fluid connection between area above and area below membrane.

The at least one of the one or more holes may comprise an elongate slot extending towards opposite edges of the dielectric membrane. The elongate slot may or may not extend completely to the edges of the dielectric membrane or completely isolate the dielectric membrane either side of the elongate slot. The elongate slot increases thermal isolation across a width of the dielectric membrane of the device. Optionally the elongate slot may extend in a same direction as one or more heating elements and/or sensing elements. The elongate slots may be, for example, rectangular, square, or semicircle.

The one or more holes may comprise an array of perforations. The perforations may comprise individual holes significantly smaller than a width of the dielectric membrane of the device. The array of perforations may extend substantially across a width of the device.

The at least one recessed region may comprise a partial recess within the dielectric membrane. The partial recess or trench may extend from a top surface of the dielectric membrane or may extend from a bottom surface of the dielectric membrane. The partial recess may extend partially through a height or depth or thickness of the dielectric membrane. The at least one perforation may be in the form of a trench formed from the top or the bottom surface but not penetrating the other surface.

The discontinuities may be referred to as a gap in the membrane from the top surface to the bottom surface. Though, not as effective in terms of the thermal performance, a discontinuity could also refer to a trench or partial hole created from either the top or the bottom surface (if an upside-down membrane is used) without penetrating the other surface. The advantage of such partial holes is that they may impact less the mechanical strength of the membrane and in some cases they may be easier to be manufactured. Moreover, such partial holes could be used to hermetically seal the bottom side of the membrane or allow no fluid penetration below the membrane.

The at least one recessed region may have a meander shape. In other words, the discontinuity may have a non-standard shape such as a concertina or corrugated shape formed of a series of regular sinuous curves, bends, or meanders.

The etched region of the semiconductor substrate may have sloped sidewalls. The etched region of the semiconductor substrate may not extend through the entire depth of the semiconductor substrate.

The semiconductor substrate may comprise an additional etched portion, and the dielectric layer may comprise an additional dielectric membrane located over the additional etched portion of the semiconductor substrate. The sensor may further comprise an additional heating element located within the additional dielectric membrane, and an additional ambient temperature sensing element.

The additional heating element and the additional ambient temperature sensing element may operate similar to the heating element and ambient temperature sensing element. This increases sensitivity of the device.

The heating element and the additional heating element may be connected in series. The additional ambient temperature sensing element and the ambient temperature sensing element may be connected in series. The sensor may comprise an additional active temperature sensing element connected in series to the active temperature sensing element, and a second active temperature sensing element in series to the second active temperature sensing element.

The heating elements may be connected in series and operated substantially at the same temperature.

The heating element and the additional heating element may be configured to operate at different temperatures.

Each sensing element in combination with a corresponding ambient and active temperature sensing elements may operate independently at different temperatures to improve the output signal or the sensor dynamic range.

The fluid sensor may further comprise a covering located on a surface of the sensor, where the covering may comprise a hole configured to allow fluid travel from an outer surface of the covering to a fluid channel above the dielectric membrane.

The fluid sensor may further comprise a further temperature sensing element located outside the membrane region. The further temperature sensing element may be thermally isolated from the heating element.

An additional or further temperature sensor may be placed outside the dielectric membrane as a reference temperature sensing element to measure the ambient temperature or the temperature of the fluid, and the signal from the further temperature sensor may be used for temperature compensation for a more accurate calculation of the flow properties.

A separate temperature sensor could be integrated on-chip as an extra resistive temperature detector, a diode or a transistor. An ambient temperature sensor could also be provided as part of the ASIC as a VPTAT or IPTAT sensor based on bandgap reference.

The temperature compensation can be done by using both the temperature reading from the additional temperature sensing element and the temperature sensor placed in the device outside the dielectric membrane. This can be implemented by either a formula (within an algorithm) to adjust the final reading, or using a look up table and interpolation to determine the final reading.

According to a further aspect of the disclosure, there is provided a sensor assembly comprising the flow sensor as described above and an application specific integrated circuit (ASIC) coupled to the sensor.

The control circuitry can be located on the same chip as the sensor (monolithically integrated), or can have an application specific integrated circuit (ASIC) coupled to the sensor. The ASIC can be on a separate chip, but within the same package, as a hybrid, co-packaged or using system in package (SIP) solutions. Alternatively, the ASIC could be placed outside the package, on a PCB (Printed Circuit Board) or within the same case/box.

The ASIC may be located underneath the sensor, for example using a die stack technique. Alternatively, the ASIC may be located side by side with the sensor or elsewhere. The ASIC may be connected to the sensor using wire bonding and pads, or using through-silicon-vias (TSV) extending through the semiconductor substrate. Alternatively, the sensor and the ASIC can be located on the surface of a common PCB or embedded in a PCB.

An ASIC may be provided within the same system or the same package or on-chip to provide electronic circuitry to drive, read-out signals and process signals from the sensor. The ASIC may be placed in a stack die configuration under the sensor and the sensor and ASIC are placed within a manifold or an open package, to allow contact to the fluid.

According to a further aspect of the disclosure, there is provided a sensor assembly comprising a sensor housing; and a flow sensor as described above located within the flow sensor housing.

The fluid sensor housing may comprise an inlet and an outlet, and a fluid flow path for directing a fluid-flow through the sensor. The sensor may be packaged within a packaging house or manifold with an inlet, outlet and a channel to provide more accurate measurements of the flow or the composition of the fluid.

According to a further aspect of the disclosure, there is provided a sensor assembly comprising the flow sensor as described above, wherein the flow sensor may be packaged on a printed circuit board in a flip-chip configuration.

The device may be packaged in a metal TO type package, in a ceramic, metal or plastic SMD (surface mount device) package. The device may also be packaged directly on a PCB, or with a flip-chip method. The device may also be embedded in a substrate, such as a customised version of one of the previously mentioned package, a rigid PCB, a semi-rigid PCB, flexible PCB, or any other substrate, in order to have the device surface flush with the substrate surface. The package can also be a chip or wafer level package, formed for example by wafer-bonding.

In particular, the package maybe designed such that there is a surface very close to the membrane, for example in a flip-chip scenario, such that the surface is less than 50 um from the membrane. This increases the power loss through the fluid and improves the sensitivity of the sensor.

According to a further aspect of the disclosure, there is provided a method of measuring the fluid speed and direction using a flow sensor as described above, the method comprising: applying an electrical bias to the heating element; and monitoring the electrical bias applied to the heating element and using the value of the electrical bias applied to the heating element and to the side sensing element to determine the flow speed and direction.

The electrical power, current, or voltage applied to the heating element may be adjusted to maintain the temperature reached by the heating element constant (by varying the heating element power, current, or voltage could be such that the resistances of the heating element remains constant to a target value). The change in the electrical power, voltage or current through the heater may be monitored to measure the velocity of the fluid flowing above the device.

The active temperature sensing elements, and optionally the heating element, may be connected to a differential amplifier or a Wheatstone bridge type circuit completed with constant resistance components, using the differential output signal as to increase the sensitivity at low flow velocity.

The measurement of the differential signal (for example, the differential resistance) can be performed in a number of ways. A first way is to apply a constant current to both the ambient and active temperature sensing elements (temperature resistive detectors) and measure the voltage difference between them using a differential amplifier. A further method is to use a Wheatstone bridge or other type of bridges. For both these methods, a calibration can be done initially to set a zero point value. This can either set a differential voltage value when the fluid around the device is not moving, or modify the current to one of the resistors to ensure the differential voltage is at zero when there is no flow above the device. Alternatively, the calibration can be done initially to set a zero point value of the differential signal when the fluid velocity is at a known speed inside the device operating range.

The method may comprise driving the heating element in pulse mode or AC mode to modulate the temperature of the heating element to vary the temperature reached by the side sensing element, ensuring it works in the area of maximum sensitivity.

The temperature of the heating element may be modulated by varying the current, voltage or power to different levels and/or with different electrical pulses such as to maintain the sensing element in the region of maximum response.

The heater (also referred to as the heating element) may be operated in a pulse mode (e.g. driven with a square wave, sinusoidal wave, Pulse Width Modulated wave (PWM), Pulse Density Modulation, etc.) or continuous mode. The pulse mode has, among others, the advantage of reduced power consumption, reduced electromigration for enhanced device reliability/lifetime, and improved fluid properties sensing capabilities. Pulses could be used in different polarities to further reduce the impact of electromigration on the heating element.

Different drive modes and measurement modes are possible. For example, the heater can be driven using PWM, and the off time of the PWM can be used to measure heater resistance, and/or differential signal. This measurement can be done in a very short time, faster than the thermal time constant of the membrane to avoid self-heating.

Decoupling the response due to changes in ambient temperature, flow speed and direction may comprise using a neural network.

An algorithm containing machine learning and artificial intelligence may be implemented. For example, the sensor or a flow sensing system may further comprise a controller or a processing system comprising a neural network. The neural network may be trained using data from different combinations of ambient temperature, flow speed and direction. The use of a trained neural network can improve accuracy, sensitivity and selectivity of the fluid sensor. A neural network algorithm can also be used to identify the optimum driving mode depending on the same variables.

The neural network may be trained to recognise the flow velocity and direction based on the difference between the active temperature sensing elements and a stored threshold. The neural network could be trained using supervised learning based on a set of data of sensor output values for known flow speed and directions at a set of heating element and ambient temperatures. The inputs to the neural network could be the sensor output values at a predetermined set of temperatures. The neural network may be configured to extract the flow intensity and direction from the heater and active sensing element signals, and optimise the heater drive to get the maximum accuracy.

Any of the resistive temperature detectors may be driven in short pulses of power, voltage or current. The temperature sensing elements (resistive temperature detectors) may be driven in a pulse mode (e.g. driven with a square wave, sinusoidal wave, Pulse Width Modulated wave, Pulse Density Modulation, etc.) or continuous mode. The pulse mode has, among others, the advantage of reduced self-heating of the temperature sensing elements, which minimises the noise and increases the sensitivity or the signal to noise ratio. This is particularly important for the active sensing temperature element, placed on the same dielectric membrane as the heating element so thermally insulated from ambient.

Whilst several methods are described, any other method of driving the sensor that can provide information on the environment that is being measured may be used.

According to a further aspect of the present disclosure, there is provided a flow sensing system comprising a fluid sensor as described above; and a controller configured to perform a method as described above.

The fluid sensing system may include a hardware or software interface wherein an algorithm is implemented to an accurate detection of intensity and direction of flow above the sensor.

A software algorithm configured to perform any of the methods as described above could be implemented to differentiate between these components and increase sensitivity related to each of the components of the fluids. The software algorithm could be implemented in a local microprocessor. Calibrated data could be stored in a memory device or integrated circuit. Alternatively, the software could be incorporated within an ASIC and driving of the sensor and processing of the signal could be done within an ASIC.

The software algorithm may be provided on a non-transitory computer readable medium comprising instructions which, when executed by a processor of a computing device, cause the computing device to carry out any of the computer implemented methods described herein.

The instructions may be provided on one or more carriers. For example there may be one or more non-transient memories, e.g. a EEPROM (e.g. a flash memory) a disk, CD- or DVD-ROM, programmed memory such as read-only memory (e.g. for Firmware), one or more transient memories (e.g. RAM), and/or a data carrier(s) such as an optical or electrical signal carrier. The memory/memories may be integrated into a corresponding processing device and/or may be separate to the processing device. Code (and/or data) to implement embodiments of the present disclosure may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language.

Processing of the signal could also be done remotely in a sensor hub, or on an external server accessed using the Internet (for example, the cloud).

Sampling and averaging of the data, as well as ways to remove outliers from the data could also be used as part of an algorithm and could be implemented in hardware using different electronic components such as micro-controllers, memories or could be done using an ASIC.

Readings from the sensor may be averaged in several ways, for example using a moving mean average or a moving median average. A moving mean average is useful for removing random noise from the signal. A moving median average is useful for removing outliers.

Additionally described herein is a method for sensing direction of fluid-flow, the method comprising: operating a heating element in a fluid-flow path; receiving a signal corresponding to a first sensed temperature; and determining a direction of fluid-flow based on the first sensed temperature and a threshold value.

The threshold value may correspond to a threshold temperature.

In some examples, the threshold value comprises a temperature.

In some examples, the threshold value comprises a voltage a current, and/or a power.

Operating the heating element in a fluid-flow path may comprise operating the heating element when said heating element is in the path of a flowing fluid, the direction and/or magnitude of which fluid-flow is to be sensed.

The direction of fluid-flow may be determined based on a difference between the first sensed temperature and the threshold value.

In some examples, the signal is received from a temperature sensing element. In some examples, the signal received from the temperature sensing element could comprise a temperature, a voltage, a current, and/or a power.

It will be appreciated that determining the first sensed temperature need not involve determining an actual temperature value, but can include receiving and/or determining a signal (e.g. a voltage, current, and/or power) that is analogous to said temperature value.

Advantageously, in contrast to, e.g., calorimetric methods, the method according to the present disclosure enables determination of the flow direction based on a reading from a single temperature sensor.

Further advantageously, a method according to the present disclosure employs a temperature sensing element that is separate from the heating element, meaning that in addition to determining a magnitude of fluid-flow based on a signal from the heater (in examples in which the sensor may also be configured to determine magnitude of fluid-flow), the direction of fluid-flow can also be determined by use of the temperature sensing element.

The method may further comprise: obtaining an ambient temperature; and determining the threshold value based on the ambient temperature.

The method may further comprise determining a second sensed temperature, and determining the direction of fluid-flow based additionally on the second sensed temperature.

In some examples, the method comprises determining the direction of fluid-flow based on a difference between the second sensed temperature and a second threshold value.

In some examples, the method comprises determining the direction of fluid-flow based on a difference between: a difference between the first and second sensed temperatures, and a threshold value.

In some examples, the method comprises determining a magnitude of fluid-flow.

Also described herein is a method of manufacturing a sensor, the sensor for sensing direction of fluid-flow, the method comprising: providing a heating element; providing a first active temperature sensing element; configuring the first active temperature sensing element to sense a first sensed temperature; providing a processor; and configuring the processor to receive a first signal corresponding to the first sensed temperature from the first active temperature sensing element, and to determine a direction of fluid-flow based on the first sensed temperature and a threshold value.

The threshold value may correspond to a threshold temperature.

In some examples, the threshold value comprises a temperature.

In some examples, the threshold value comprises a voltage, a current, and/or a power.

In some examples, the processor is configured to determine the magnitude and/or direction of fluid-flow based on a difference between the first sensed temperature and the threshold value.

Advantageously, in contrast to, e.g., calorimetric sensors, a sensor manufactured according to the method according to the present disclosure enables determination of the flow direction based on a reading from a single active temperature sensor resulting in a simplified device.

Further advantageously, a sensor manufactured according to the method according to the present disclosure employs a temperature sensing element that is separate from the heating element, meaning that in addition to determining a magnitude of fluid-flow based on a signal from the heater (in examples in which the sensor may also be configured to determine magnitude of fluid-flow), the direction of fluid-flow can also be determined by use of the temperature sensing element.

Also described herein is another method of manufacturing a fluid sensor as described herein, the method comprising: forming a first dielectric membrane located over a first etched portion of a semiconductor substrate semiconductor substrate comprising a first etched portion; forming a heating element located within the first dielectric membrane; forming an ambient temperature sensing element spatially separated from the heating element, wherein the ambient temperature sensing element is located outside of the first dielectric membrane and over the semiconductor substrate, or wherein the ambient temperature sensing element is located on or within the first dielectric membrane and wherein the fluid sensor comprises at least one recessed region within the first dielectric membrane configured to thermally isolate the heating element from the first temperature sensing element.

It will be appreciated that any of the first, second, and/or third signals may comprise, e.g., a voltage, a current, a temperature, and/or a power.

Instead of, or in addition to, the determination of the direction of fluid-flow based on the difference between the first/second sensed temperature and the threshold value, the direction of fluid-flow may be determined based on a difference between: a difference between the first and second sensed temperatures, and a threshold value. The processor may be configured to determine the difference between the first and second sensed temperatures, and to determine the difference between: the difference between the first and second sensed temperatures and the threshold value. In this configuration, the first and second active temperature sensing elements are preferably located at substantially the same distance from the heating element.

Ideally, the threshold for the difference between the first and second sensed temperatures should be zero. However, in reality this threshold may be determined based on a calibration. The threshold may vary with temperature.

The heating element and the first active temperature sensing element can also be identical and be swapped. The flow sensor may have a first resistor and a second resistor, where the first resistor acts as the heating element and the second resistor acts as a first active temperature sensing element. Periodically, the roles maybe swapped, or reversed, so that the first resistor acts as the first active temperature sensing element, and the second resistor acts as the heating element. This can increase the device lifetime as each heater is on for only half the time. It also provides more information that can be used to more accurately determine direction, especially at low flows.

BRIEF DESCRIPTION OF THE DRAWINGS

Some embodiments of the disclosure will now be described by way of example only and with reference to the accompanying drawings, in which:

FIG. 15 schematically illustrates an algorithm required to evaluate flow speed and direction when the heater is driven in constant temperature, where the ambient temperature contains enough information to evaluate the active sensor threshold;

FIG. 16 schematically illustrates an algorithm required to evaluate the speed and direction when the heater is driven in a mode different from constant temperature, where the heater output signal is required to accurately determine the active sensor threshold;

FIG. 18 schematically illustrates a method for sensing direction of fluid-flow according to the present disclosure; and FIG. 19 schematically illustrates a method of manufacturing a sensor according to the present disclosure.

DETAILED DESCRIPTION OF THE PREFERRED EMBODIMENTS

Figure 1:
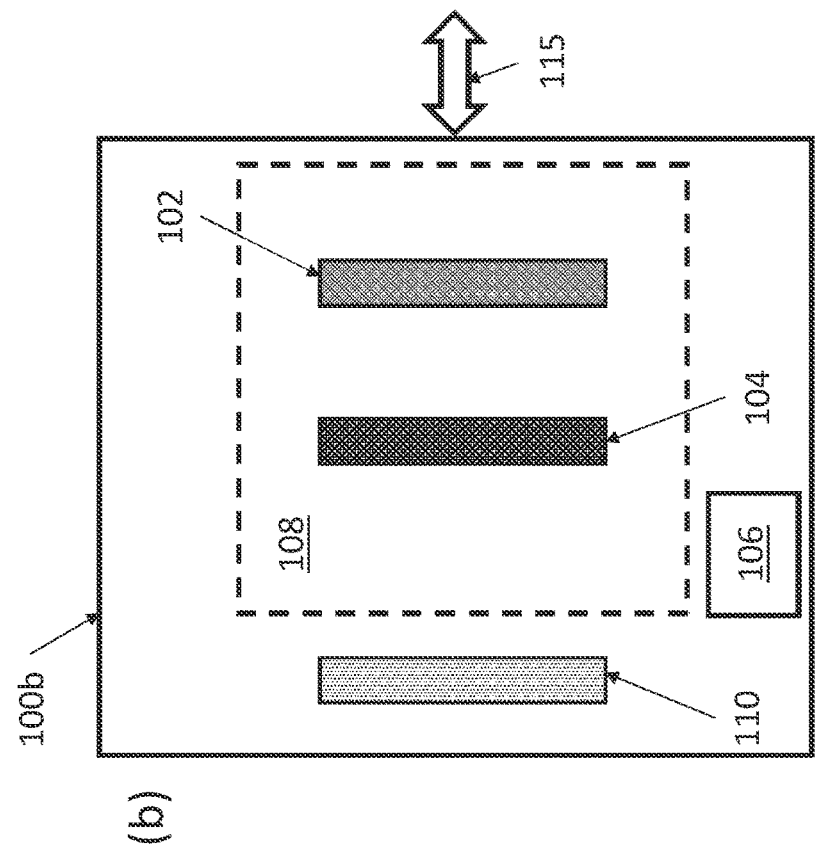
FIG. 1(a) schematically illustrates a sensor comprising a heating element, an active temperature sensing element, and a processor.
FIG. 1(b) schematically illustrates a sensor similar to the sensor of FIG. 1(a), further comprising an ambient temperature sensing element.
Figure 1:
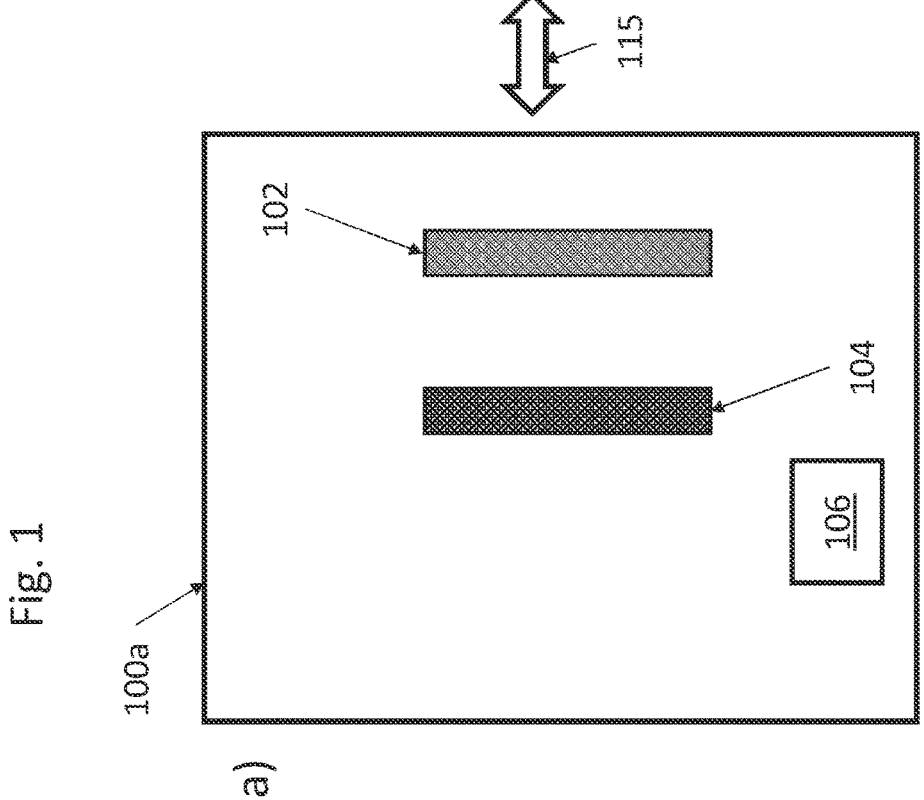

FIG. 1(*a*) schematically illustrates an example of a sensor 100*a* according to the present disclosure. The sensor 100*a* comprises a heating element 104 and a first active temperature sensing element 102. The heating element 104 and/or the first active temperature sensing element 102 may comprise a resistor and/or a thermopile. The sensor 100*a* further comprises a processor 106. In the example illustrated in FIG. 1(*a*), the processor 106 is shown as being disposed directly on the sensor 100*a* ("on-chip"). However, in some examples the processor 106 is separate from the rest of the sensor.

In operation, heat generated by the heating element 104 diffuses into an area surrounding the heating element 104. The presence of fluid-flow (indicated by the double arrow 115) causes the heat generated to move downstream from the heating element 104, resulting in a stronger cooling effect on the upstream side. The processor 106 is configured to determine a direction of fluid-flow based on a temperature sensed by the first active temperature sensing element 102.

In some examples, the processor 106 is configured to determine a magnitude of fluid-flow, for example based on a signal received from the heating element 104, where the magnitude of fluid-flow may be determined e.g. by an anemometric method.

FIG. 1(*b*) illustrates a further example of a sensor 100*b* according to the present disclosure. The sensor 100*b* is substantially similar to the sensor 100*a* illustrated in FIG. 1(*a*). However, the sensor 100*b* additionally comprises an ambient temperature sensing element 110. The ambient temperature sensing element 110 may be thermally decoupled from the heating element 104, for example by being situated outside of a thermally coupled region 108 of the sensor 100*b* (where the thermally coupled region 108 provides thermal coupling between the heating element 104, the fluid, and the first temperature sensing element 102).

The processor 106 may be further configured to determine a direction of the fluid flow based on a difference between the temperature sensed by the first temperature sensing element 102 and a threshold value. The threshold value may be determined based on an ambient temperature, where the ambient temperature may be detected by the ambient temperature sensing element 110. For example, the threshold value may comprise a temperature, a voltage, a current, and/or a power. The threshold value may additionally be determined based on a calibration between the first temperature sensing element 102 and the temperature sensed by the ambient temperature sensing element 110.

Additional illustrative examples will now be described.

Figure 2:
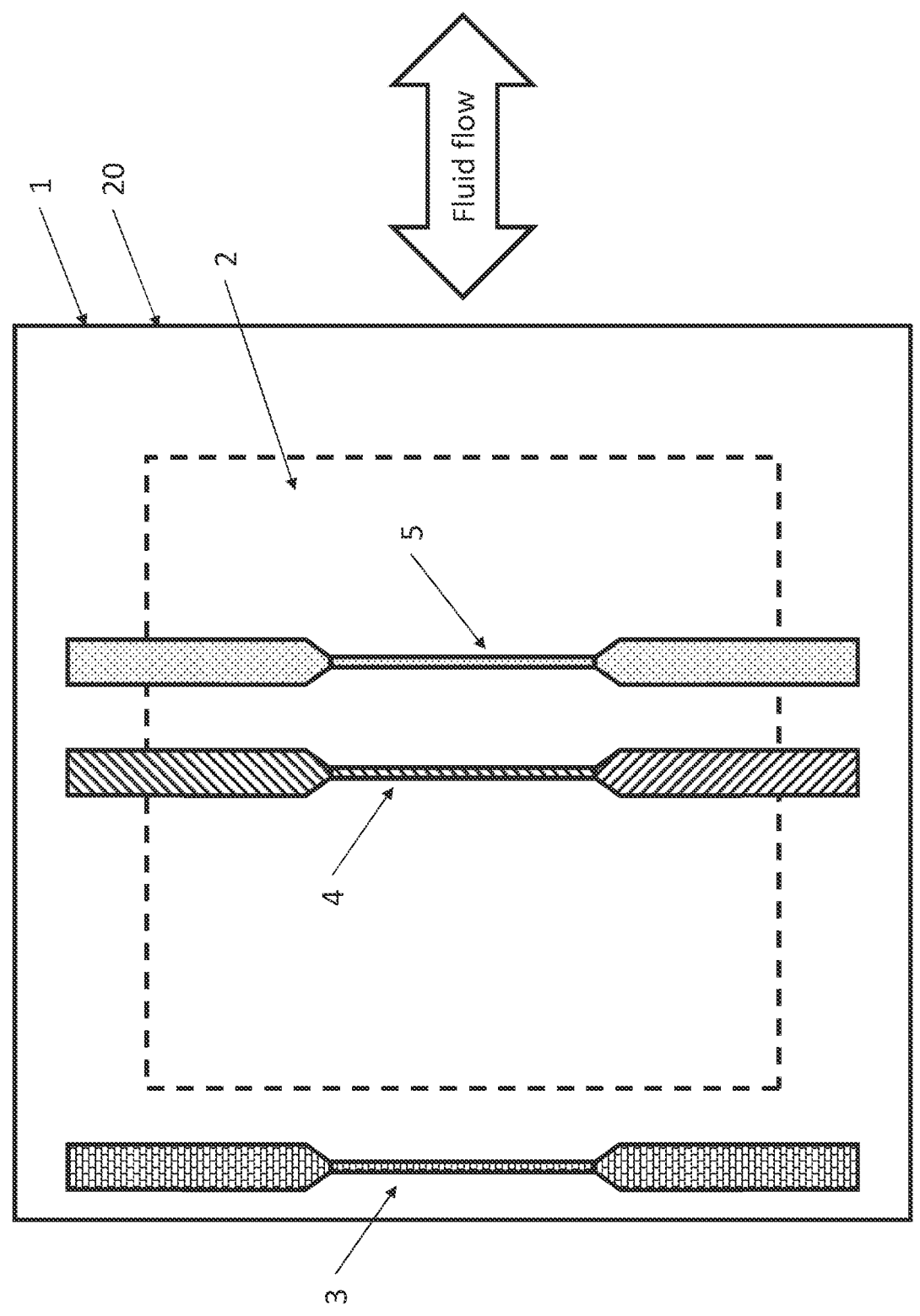
FIG. 2 shows a top view of a flow sensor with a silicon substrate, a dielectric membrane, a resistor placed outside the membrane to monitor ambient temperature, and embedded in the membrane a heating resistor and the active sensing resistor laterally displaced from the heating resistor.

FIG. 2 shows a top view of a fluid sensor. It comprises a chip made of a semiconductor substrate 1 and a dielectric layer 20 or region suspended on or over an etched portion of the semiconductor substrate 1, defining a region of the dielectric layer 20 above the etched portion as a dielectric membrane 2. There is a resistor 3 above the substrate and two additional resistors 4 and 5 embedded within the membrane 2. The resistor 3 is configured to operate as a temperature sensing element to monitor ambient temperature, while resistor 4 is configured as a heating element. In this embodiment, resistor 5 acts as active temperature sensor element at a fixed distance from the heater 4.

Due to the spatial proximity between the heating element 4 and the first temperature sensing element 5, the latter will be operating at a temperature higher than ambient when the former is biased. The temperature reached by the sensing element 5 is dependent on the ambient conditions and the temperature reached by the heater 4, as well as the flow speed and direction that affect the temperature profile above the membrane.

The temperature differential (differential signal) between the temperature reached by the sensing element 5 in no flow conditions and the measured value may be proportional to the flow speed whereas the proportionality constant is a function of the flow direction.

For example, if the flow is moving from the heating element 4 to the sensing element 5 the temperature of the latter will be reduced from the value at no flow, but when the flow goes the opposite direction the resistor 5 will be cooled down to an even lower temperature as it is upstream from the heat source.

The output signal from the sensing wire 5 can be compared to a threshold value, depending on ambient temperature and biasing conditions of the heating element 4, to establish if the resistor 5 is upstream (below threshold) or downstream (above threshold) from the heating wire 4.

Depending on the temperature sensing element employed, the output signal can be different. For diodes supplied with constant current, or for thermopiles, a voltage signal is the best option thanks to its linearity with temperature. For Resistive Temperature Detectors (RTD), the resistance value is monitored with a bias either in voltage or current that is small enough as to minimise self-heating.

In this figure, the membrane is shown as square. However, it can also be circular, rectangular with rounded corners or any other shape. Similarly the resistors 2 and 3 are shown as rectangular, but can be any shape including ring, meander or rectangular. The resistor maybe made of a CMOS metal such as aluminium, tungsten, titanium or copper, or a non-CMOS metal such as gold or platinum, or from polysilicon or single crystal silicon.

Figure 3:
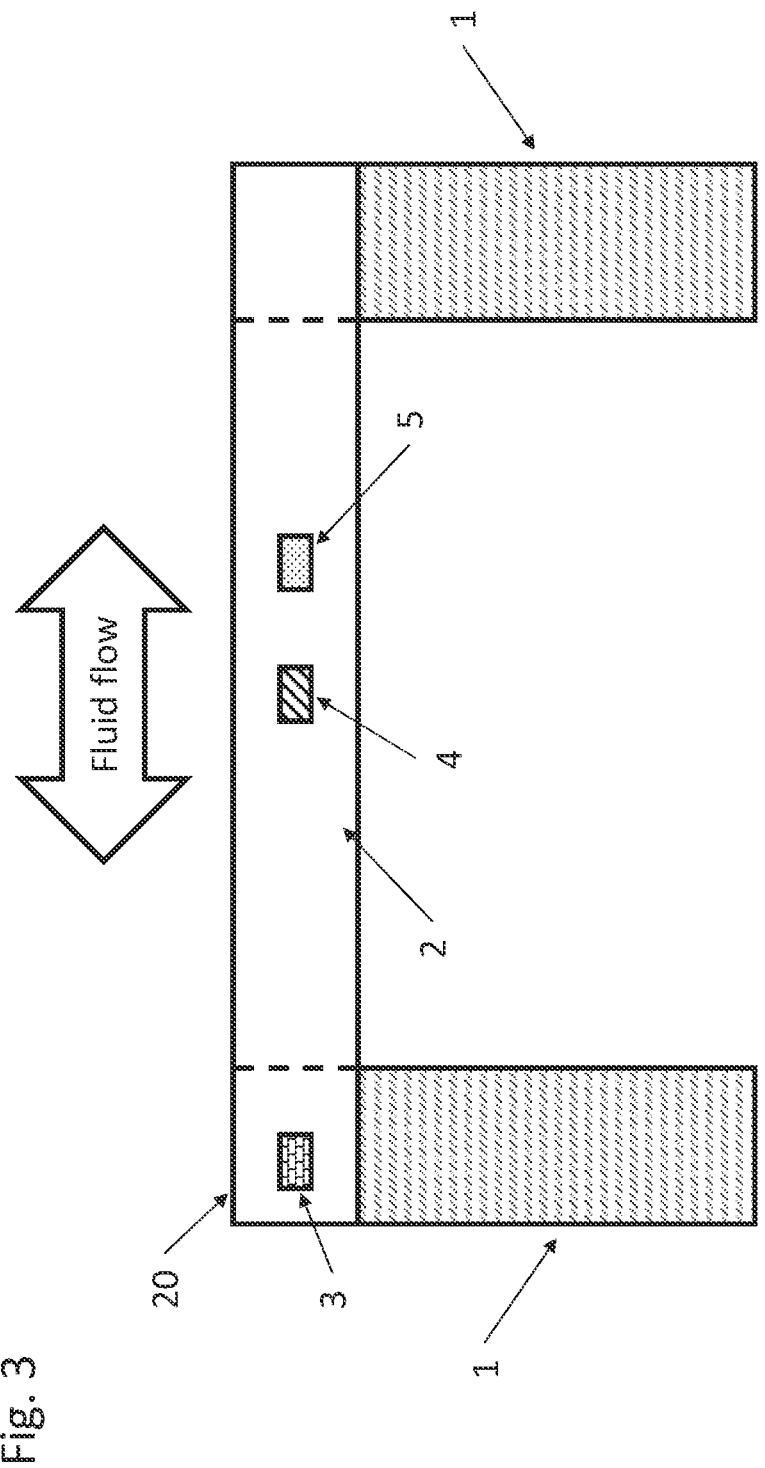
FIG. 3 shows a cross-section of a flow sensor shown in FIG. 2.
Figure 4:
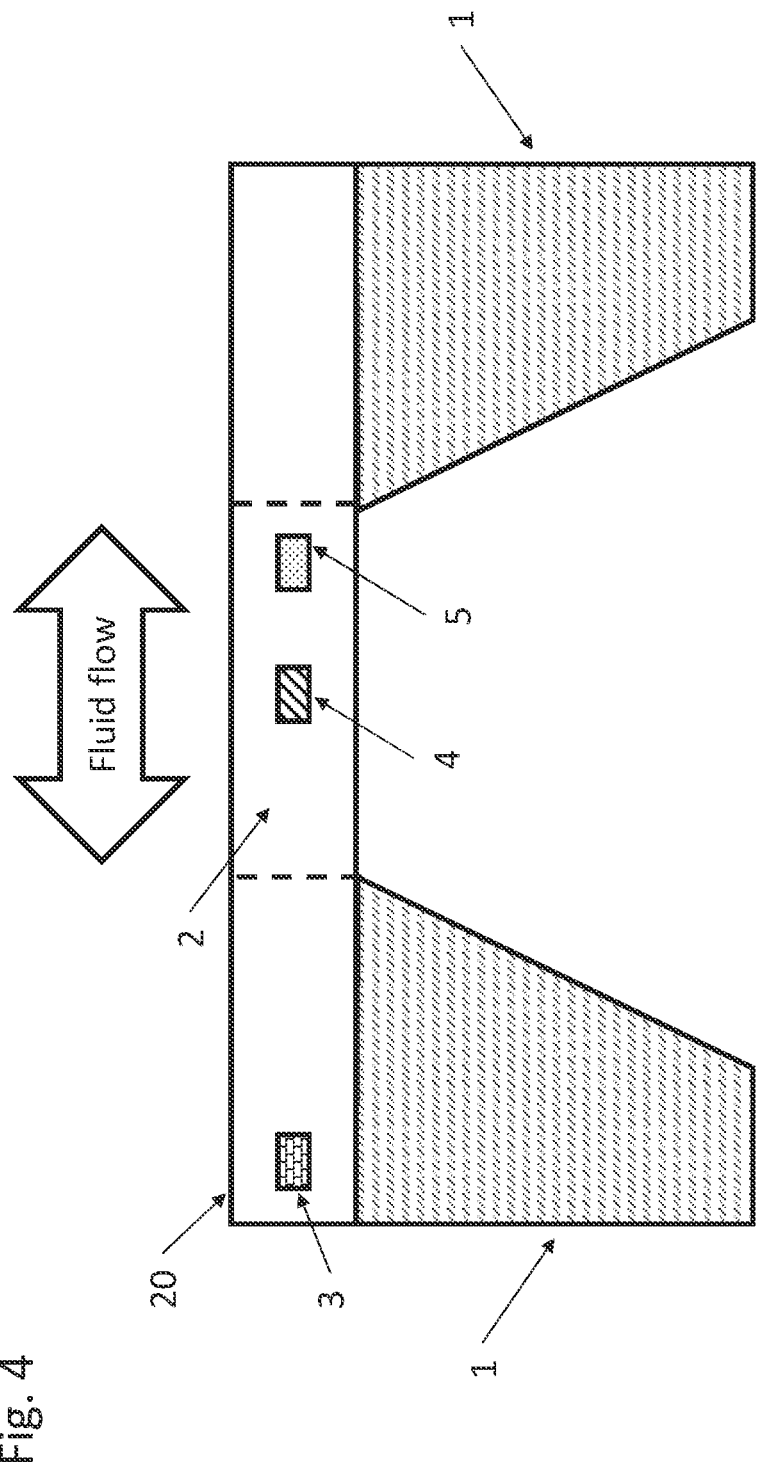
FIG. 4 shows a cross section of a flow sensor where the membrane etching is such that the etch edges are at an angle.

FIG. 3 shows a cross section of the sensor in FIG. 2, with the membrane etching obtained using a DRIE process, whereas FIG. 4 shows the same structure where the membrane is obtained with a wet etch such as KOH resulting in tilted edges.

Figure 5:
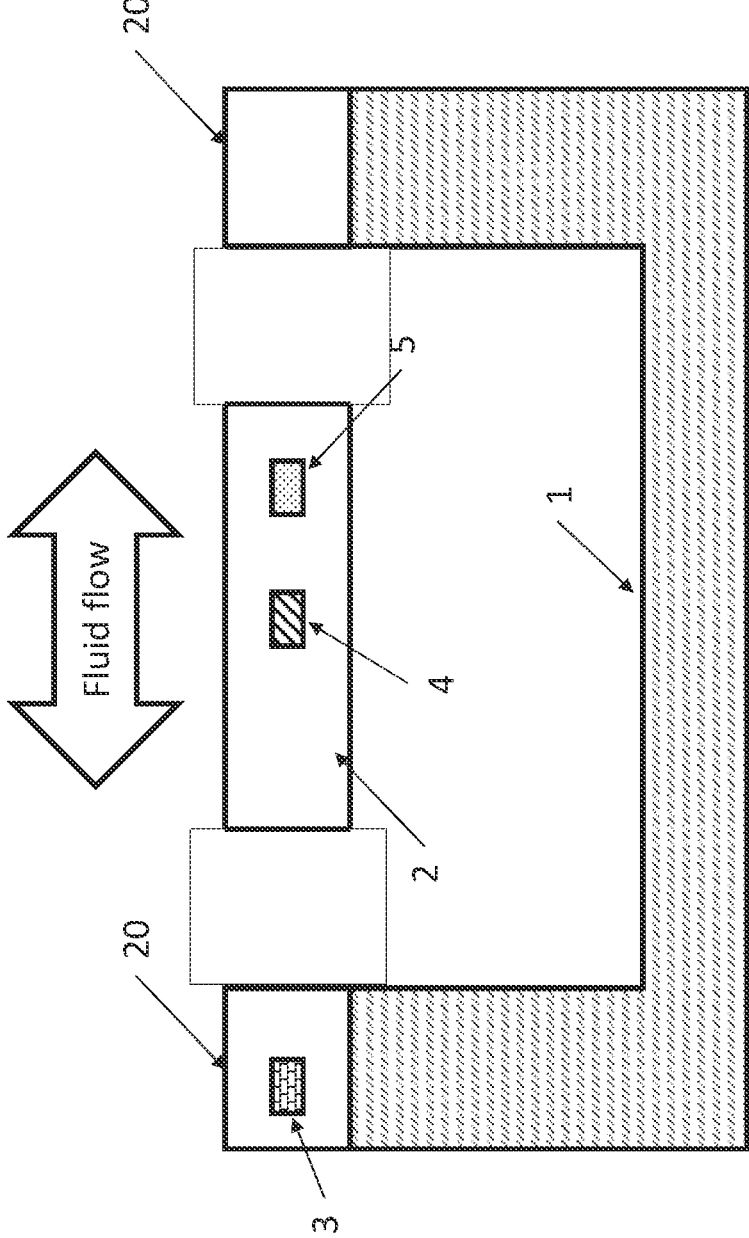
FIG. 5 shows a cross section of a flow sensor where the membrane is obtained via front etching.

FIG. 5, instead, shows the same structure where the membrane is obtained with front etching, resulting in a suspended membrane as evident from the gaps on either side of the resistive elements 4 and 5. These representations are not limiting, and other processes can be also used to achieve a membrane-like structure.

Figure 6:
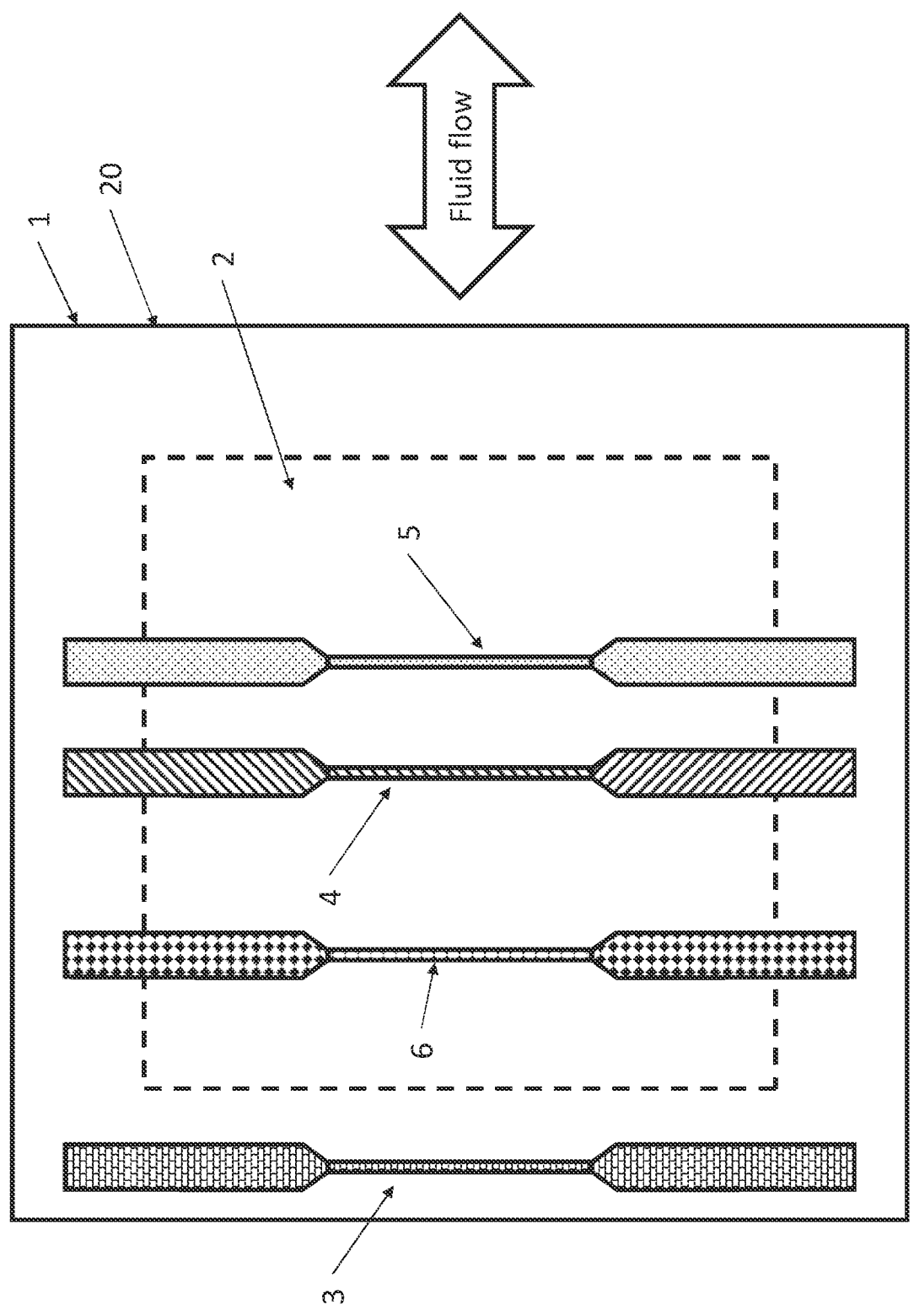
FIG. 6 shows a top view of a variation on the flow sensor with two active resistors within the membrane on either sides of the heater.

FIG. 6 shows a top view of an alternative directional flow sensor with two sensing wires 5, 6 are placed on each side of the heater 4. The two wires are measured independently and placed at different distances from element 4 to give best results at different flow ranges.

Figure 7:
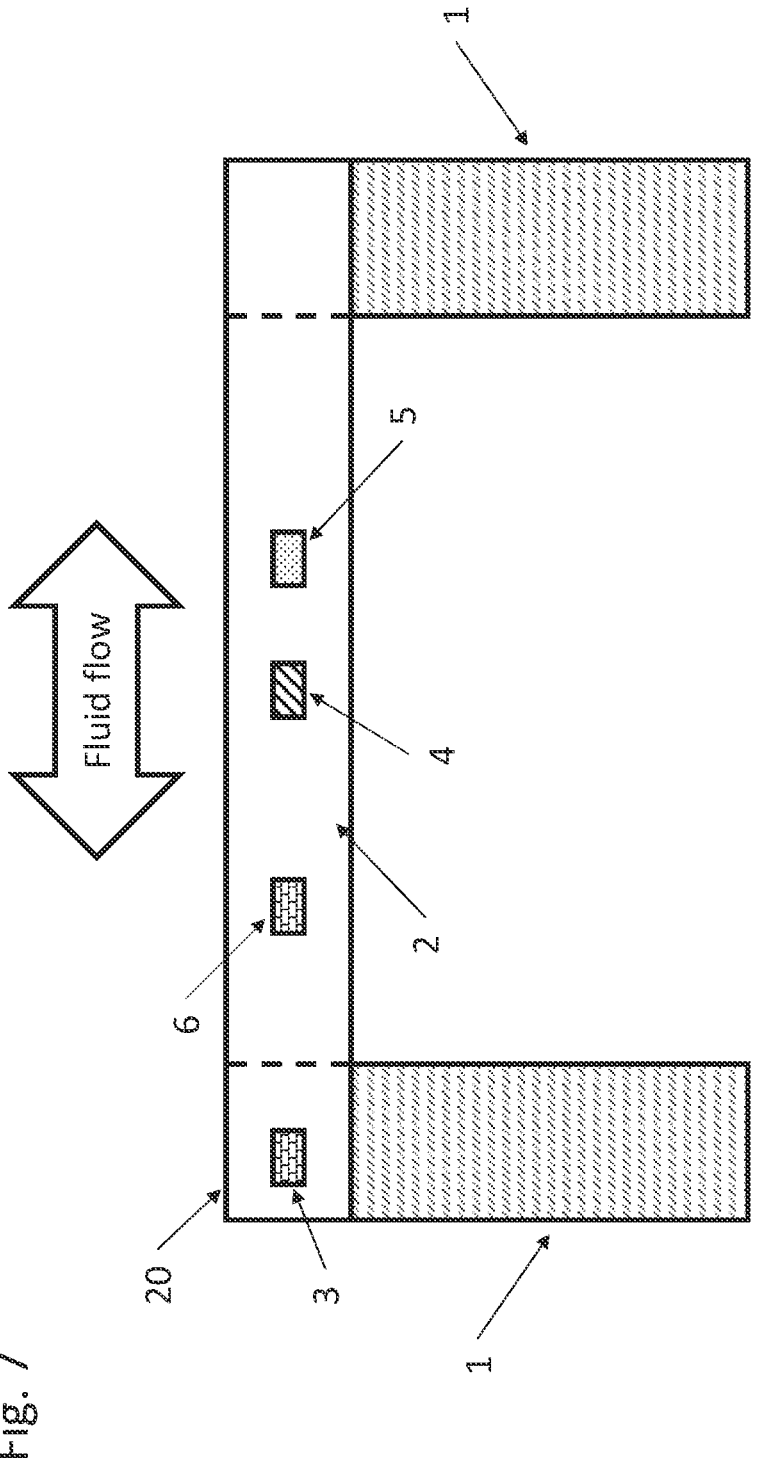
FIG. 7 shows a cross section of a flow sensor shown in FIG. 6.

FIG. 7 illustrates a cross-section of the sensor of FIG. 5 obtained with a DRIE etching process. Other processes, such as KOH etching or front etching, can be used to obtain a membrane-like structure.

Figure 8:
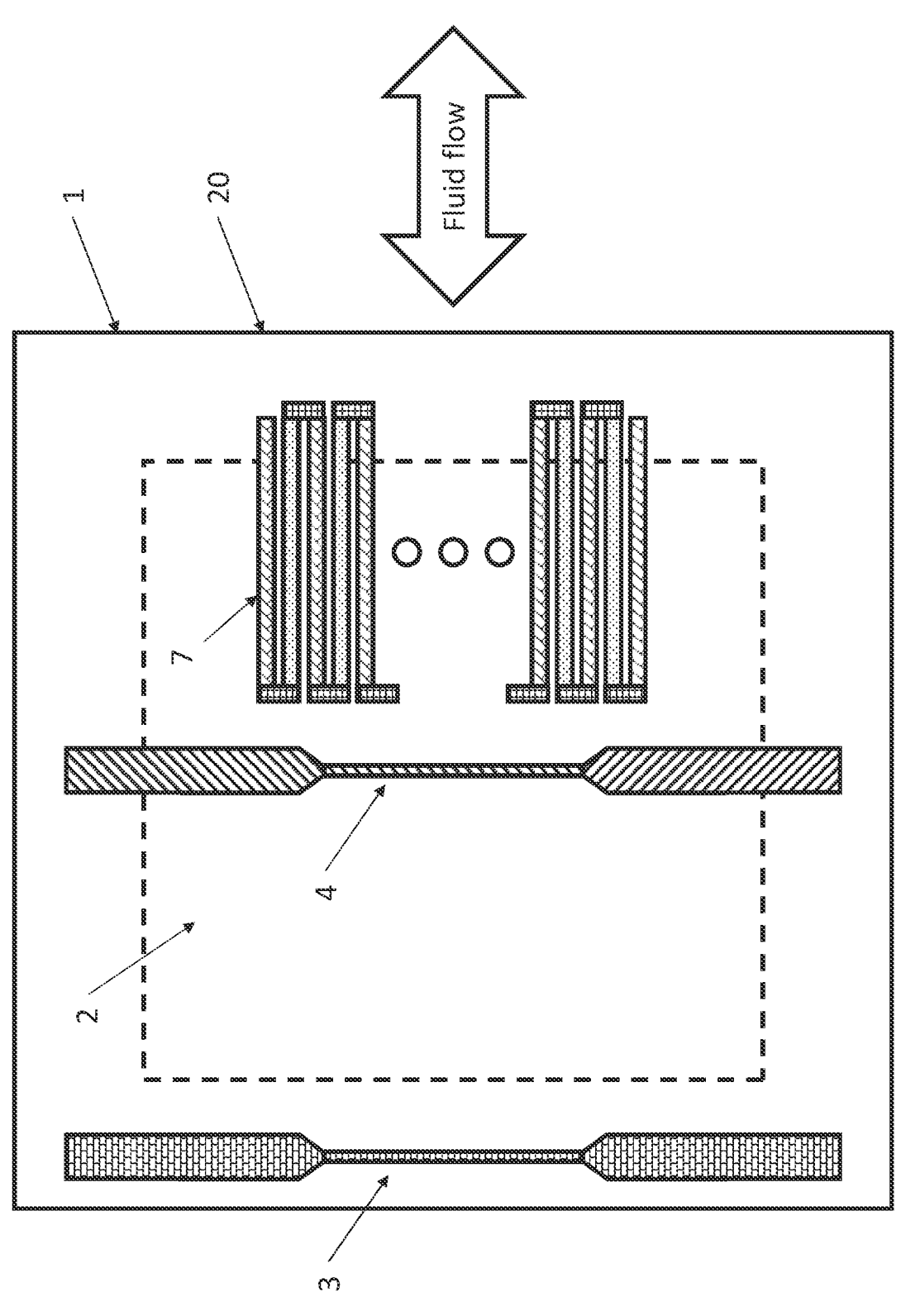
FIG. 8 shows a top view of a flow sensor comprising a thermopile rather than a resistor to detect the fluid-flow.

FIG. 8 shows the top view of an alternative configuration from FIG. 1, where a thermopile 7 is used to detect the local temperature rather than a resistive element, The arms of the thermopile can be made of different material, be they semiconductors such as mono or polycrystalline silicon doped either n or p, metals included in the CMOS process such as aluminium, tungsten or copper or additional metals not included in the standard CMOS process such as gold or platinum.

Figure 9:
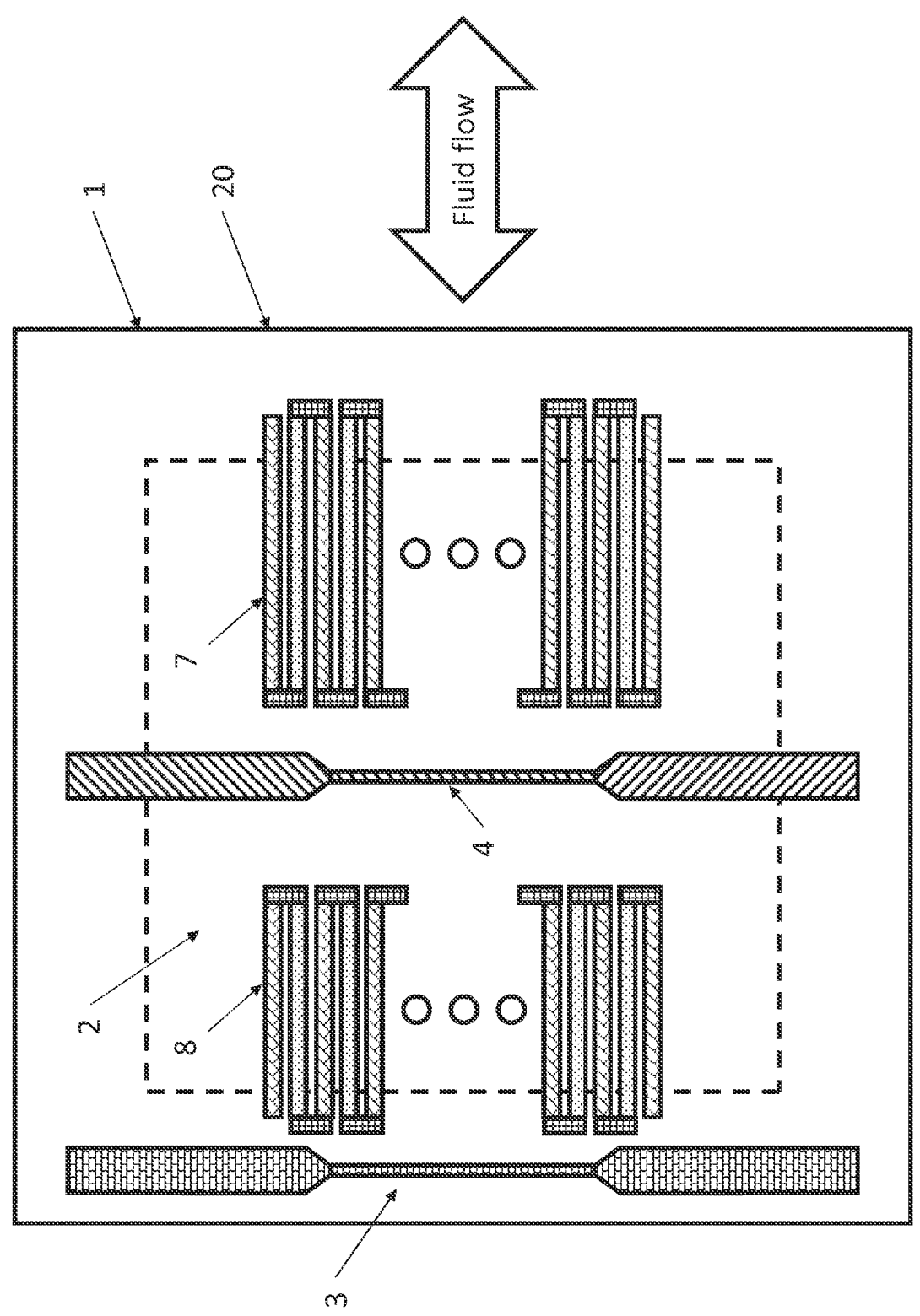
FIG. 9 shows a top view of a flow sensor that employs two thermopiles with hot junction at different distance from the heater to measure the flow direction and speed.

FIG. 9 shows the top view of an alternative configuration where two thermopiles 7, 8 are used to measure the local temperature at different distances from the heater 4.

Figure 10:
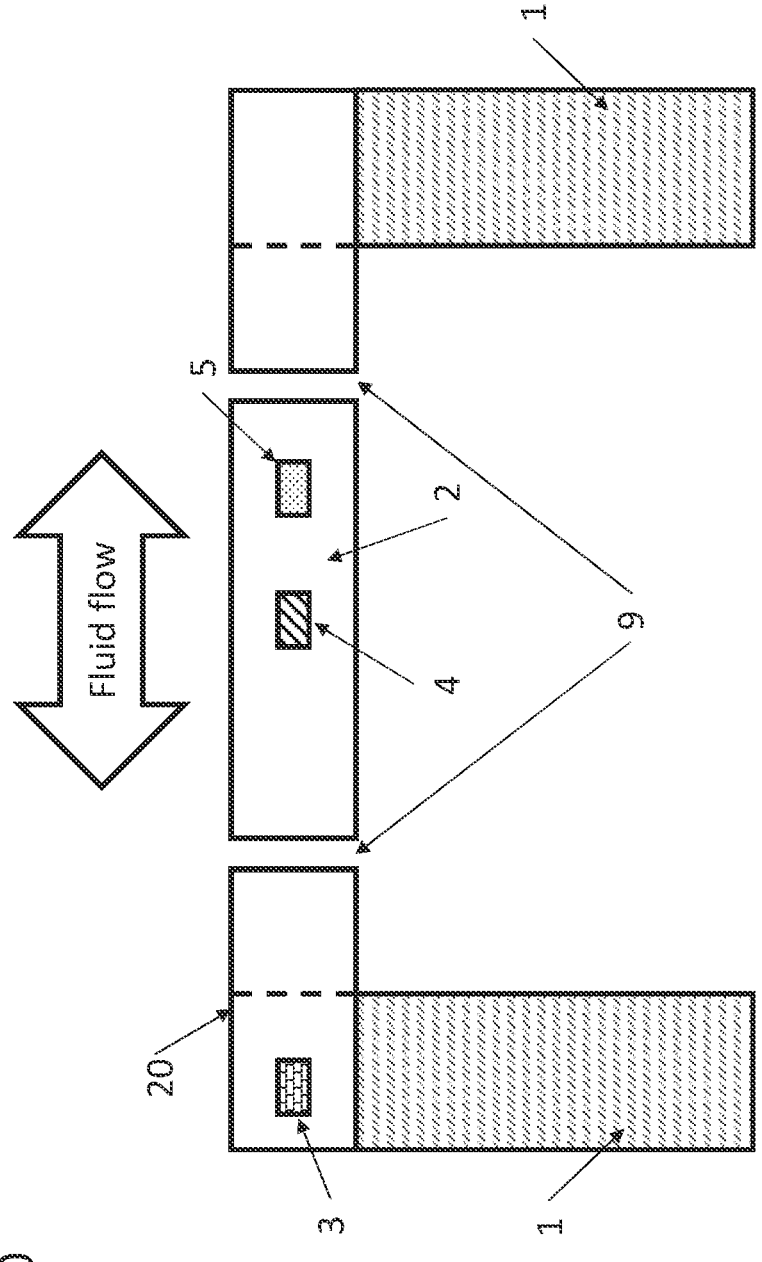
FIG. 10 shows a cross section of a flow sensor similar to the one in FIG. 2, with added holes in the membrane to increase the thermal coupling between the heater and the active temperature sensor.

FIG. 10 shows the cross section of a structure similar to the one presented in FIG. 2 where the membrane 2 has been locally etched to create recessed regions 9. These recessed regions can go through part of the membrane or all of it, can be placed symmetrically or only on one side of the heater 4, and between sensing element 2 and substrate 1 or between heater 4 and sensing element 2 depending on the application.

The recessed regions 9 minimise the thermal path through the solid dielectric membrane, forcing more heat to dissipate via convection and conduction through the environment (mostly above the membrane via conduction and convection), but partly also via heat conduction through the space formed by the slots or below the membrane. In this way a larger proportion of the heat loss of the heating element is to the surrounding fluid. This effectively increases the influence of air properties in the heat dissipation, boosting the device signal to changes in flow.

The presence of the slots also helps to reduce the power consumption of the device (for the same heater temperature), because of the reduction in the total heat losses. Furthermore, the slots help to reduce the thermal response time (increase the speed at which the heater heats up when supplied with an electrical power pulse) due to the decrease in the thermal mass of the membrane.

Figure 11:
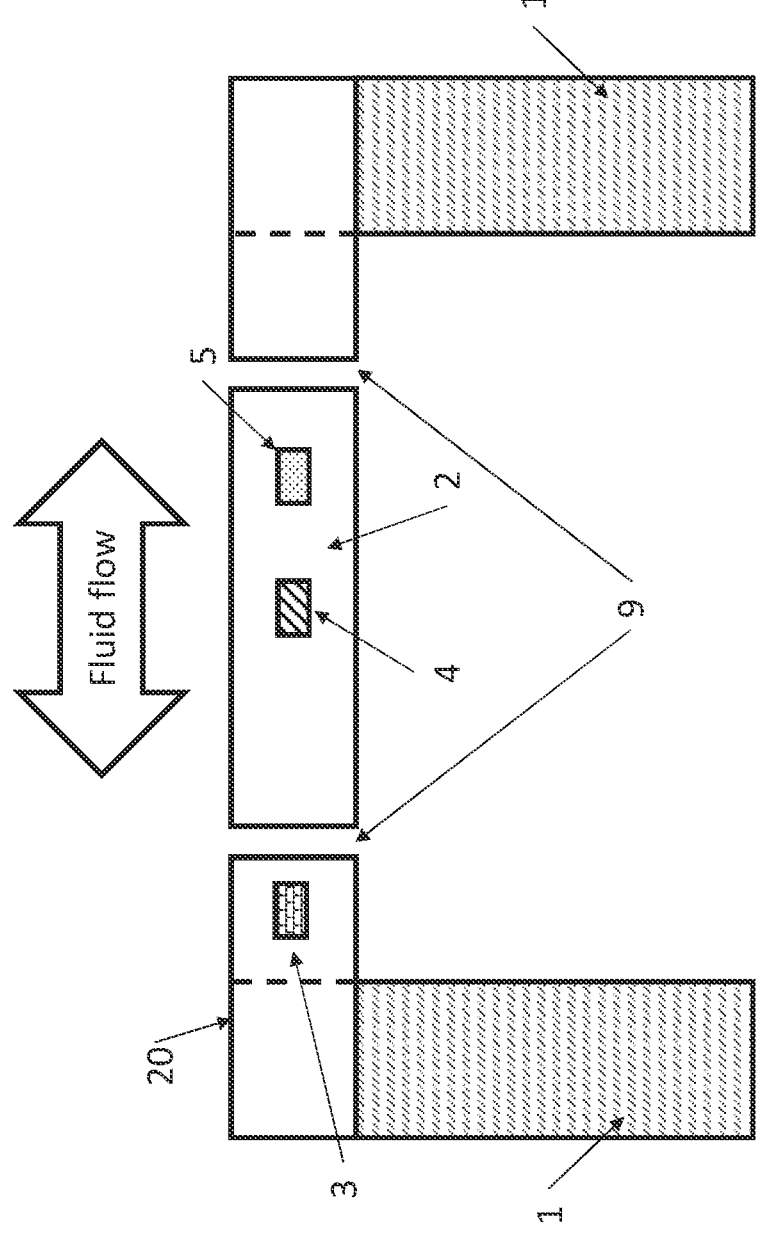
FIG. 11 shows a cross section of a flow sensor similar to the one in FIG. 10, where the ambient temperature sensor is on the membrane, but separated from the heater by a recess in the membrane.

FIG. 11 shows the cross section of a structure similar to the one presented in FIG. 10, but the ambient temperature sensor 3 is within the dielectric membrane 2, but separated from the heater 4 by a recess 9 in the membrane 2 (where it will be appreciated that the membrane 2 is defined above the etched region of the semiconductor substrate 1).

Figure 12:
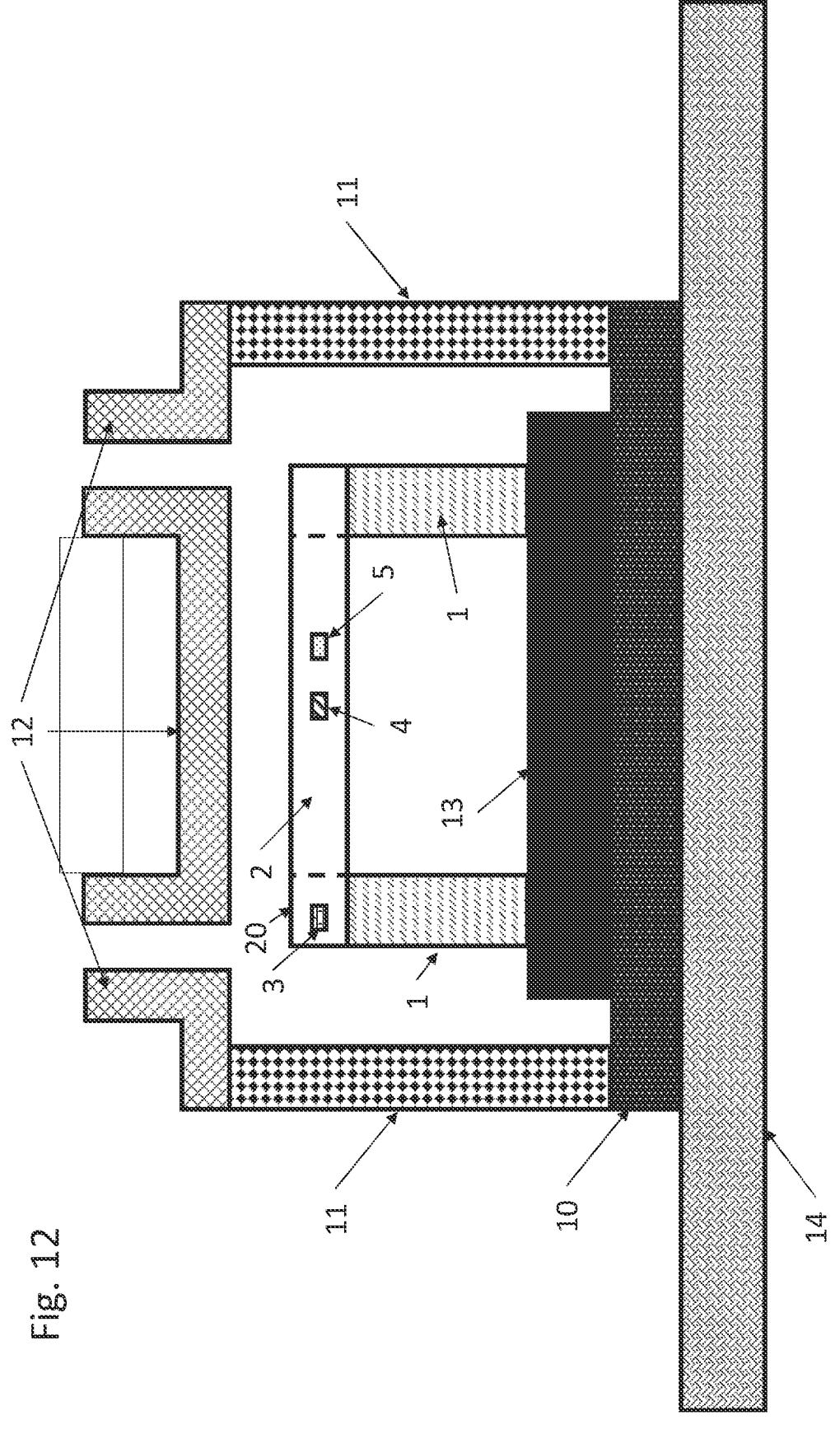
FIG. 12 shows a sensor inside a package, composed of a rigid bottom part containing metal pads used to electrically interact with the sensor, side walls and a lid including two ports for flow inlet and outlet, co-packaged with an ASIC or microcontroller and mounted on a PCB.

FIG. 12 presents a possible co-packaging strategy. The die, including the substrate 1 insulating membrane 2 heater 4 and temperature sensors on 5 and off 3 the membrane is mounted on an ASIC 14 specifically designed to interpret the device output. The ASIC is then connected to an insulating plate 10 with electrical pads, mounted then on a PCB 13 used to interface with the device. The walls 11 around it are designed to enclose the sensor, where the package ceiling 12 has two ports for flow input and output. Input and output ports can also face sideways from the lid, not necessarily upwards.

Figure 13:
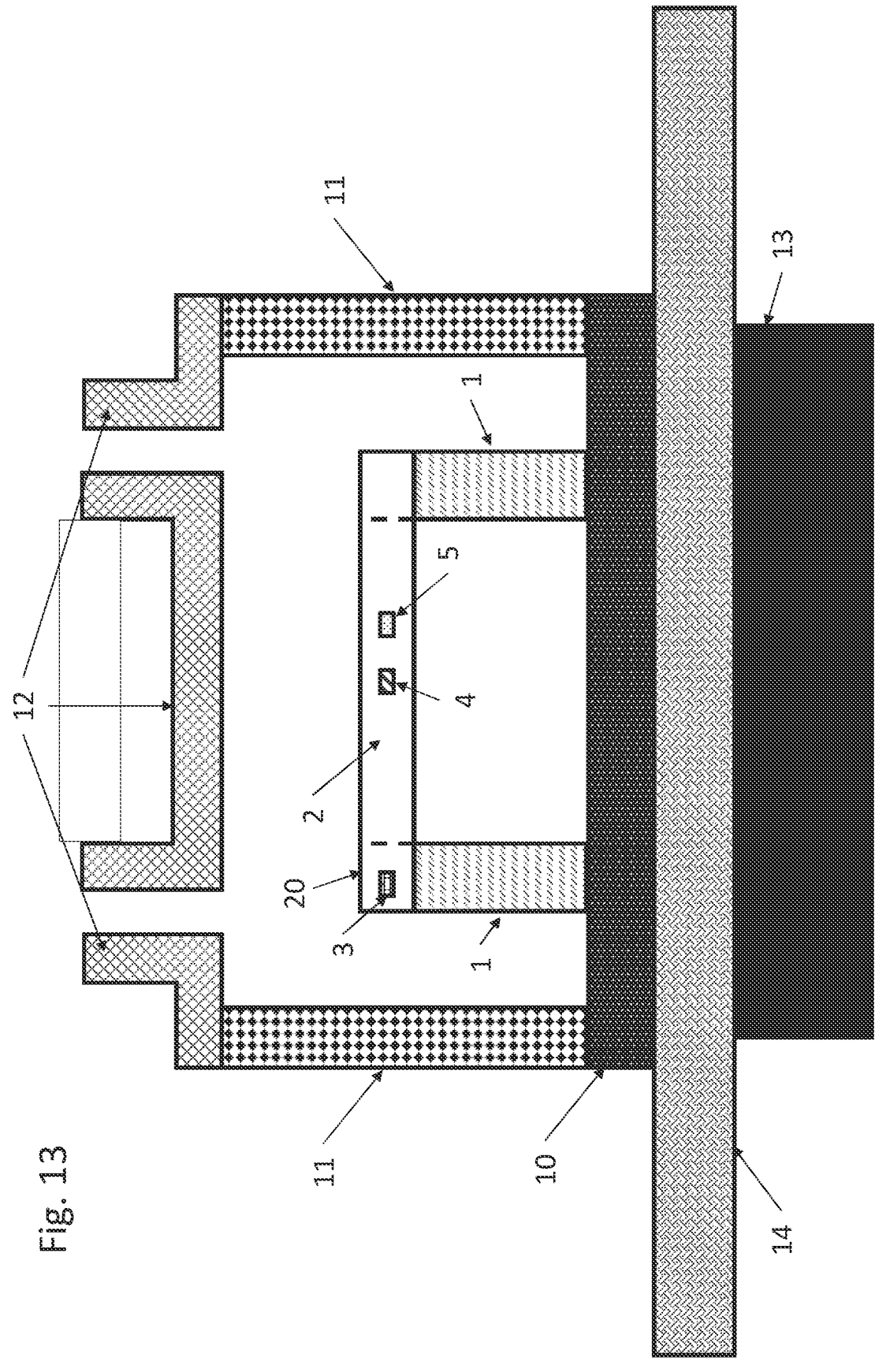
FIG. 13 shows an alternative configuration where the packaged die and the ASIC sits on the opposite side of the PCB.

FIG. 13 shows a different integration strategy, where the ASIC 14 is not directly under the die substrate 1 but on the other side of the PCB 13. In this configuration, the thermal coupling between ASIC and sensor is reduced, with the sensor being able to better track the ambient temperature resulting in higher accuracy.

Figure 14:
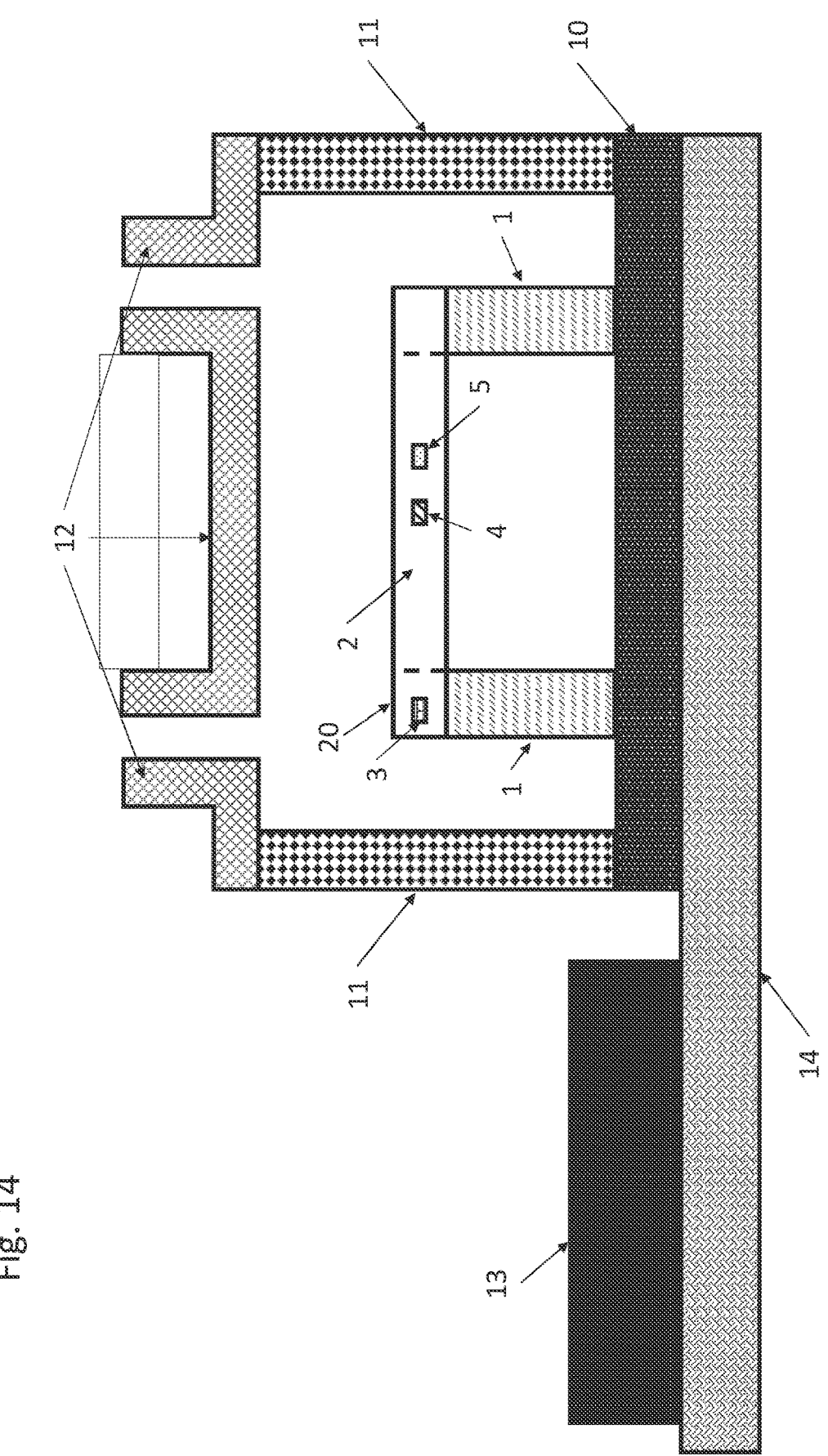
FIG. 14 shows an alternative configuration where the ASIC is mounted on the same PCB next to the package.

FIG. 14 shows a different integration strategy, where the ASIC 14 is located in a separate area of the PCB from the sensor, either on the same or opposite side of the PCB. This configuration results in a smaller thermal coupling than the solution in FIG. 12, but has to rely on longer connections that can degrade the signal.

Figure 15:
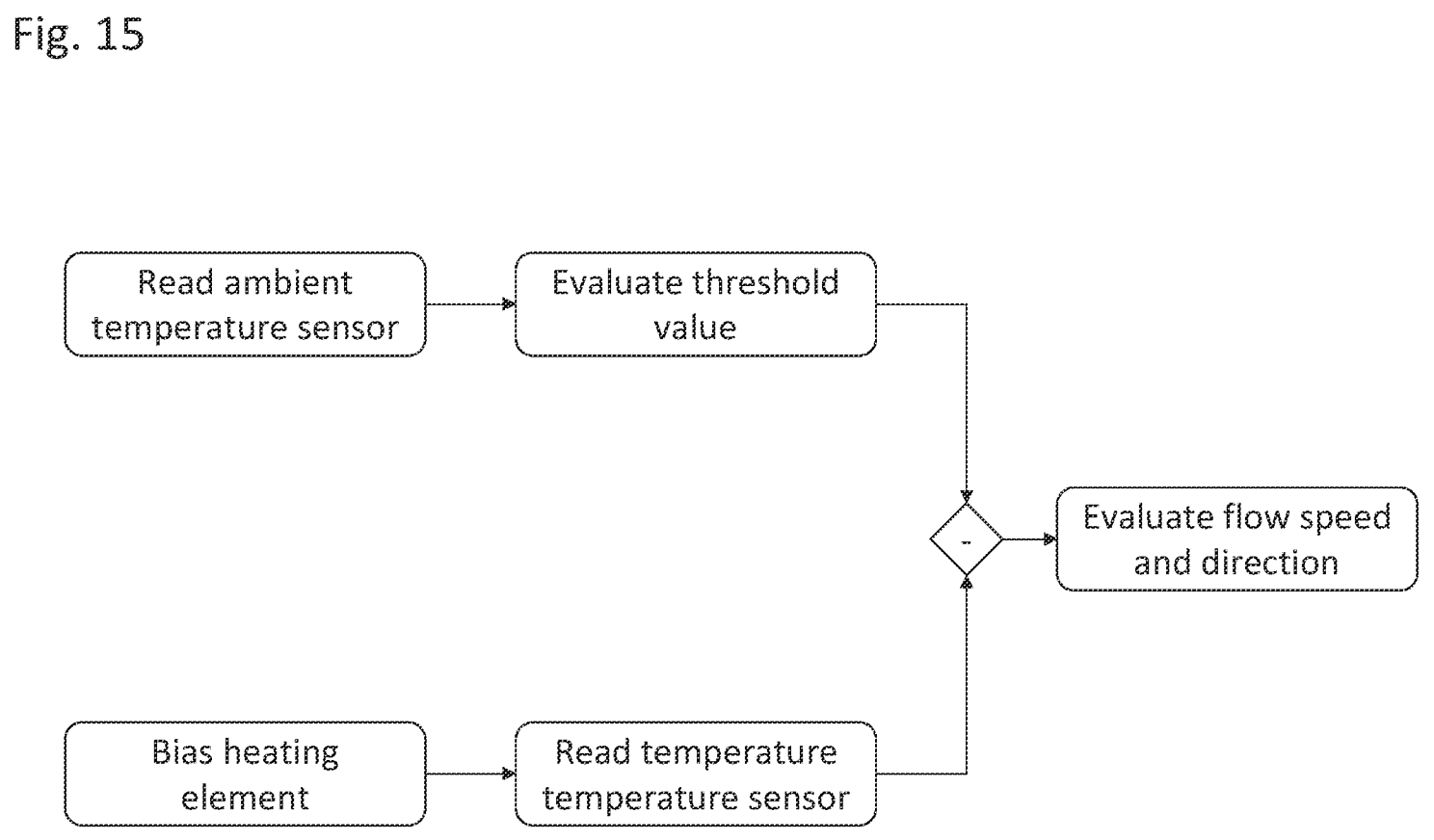

FIG. 15 shows a simplified algorithm to be used when the heater is biased in constant temperature mode and the active sensor is used to evaluate flow speed and direction. The ambient temperature sensing element is used to evaluate the threshold value. An equivalent strategy can be to use the heating element to determine the flow intensity with a standard anemometric process, and use the comparison between temperature sensor and threshold only to determine the flow direction.

Figure 16:
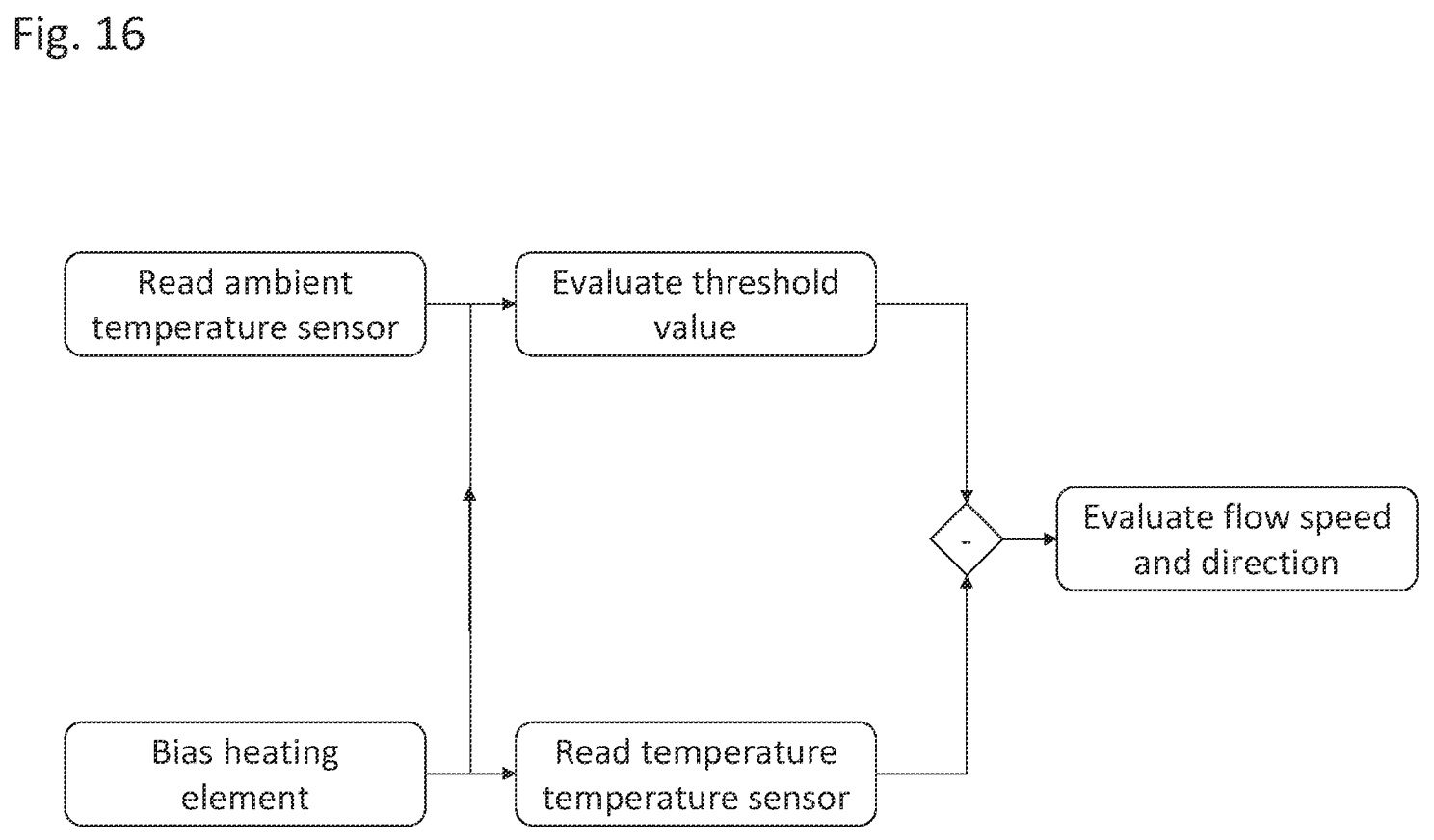

FIG. 16 shows a variation of the algorithm presented in FIG. 14 to be used when the heater is not biased in constant temperature. In this case, the signal from both ambient temperature sensor and heater are required to evaluate the threshold needed in the comparison. As before, both flow speed and direction can be detected using only the active sensor, or the heater can be used in an anemometric mode to determine the flow speed and the comparison is used only to determine the direction.

Figure 17:
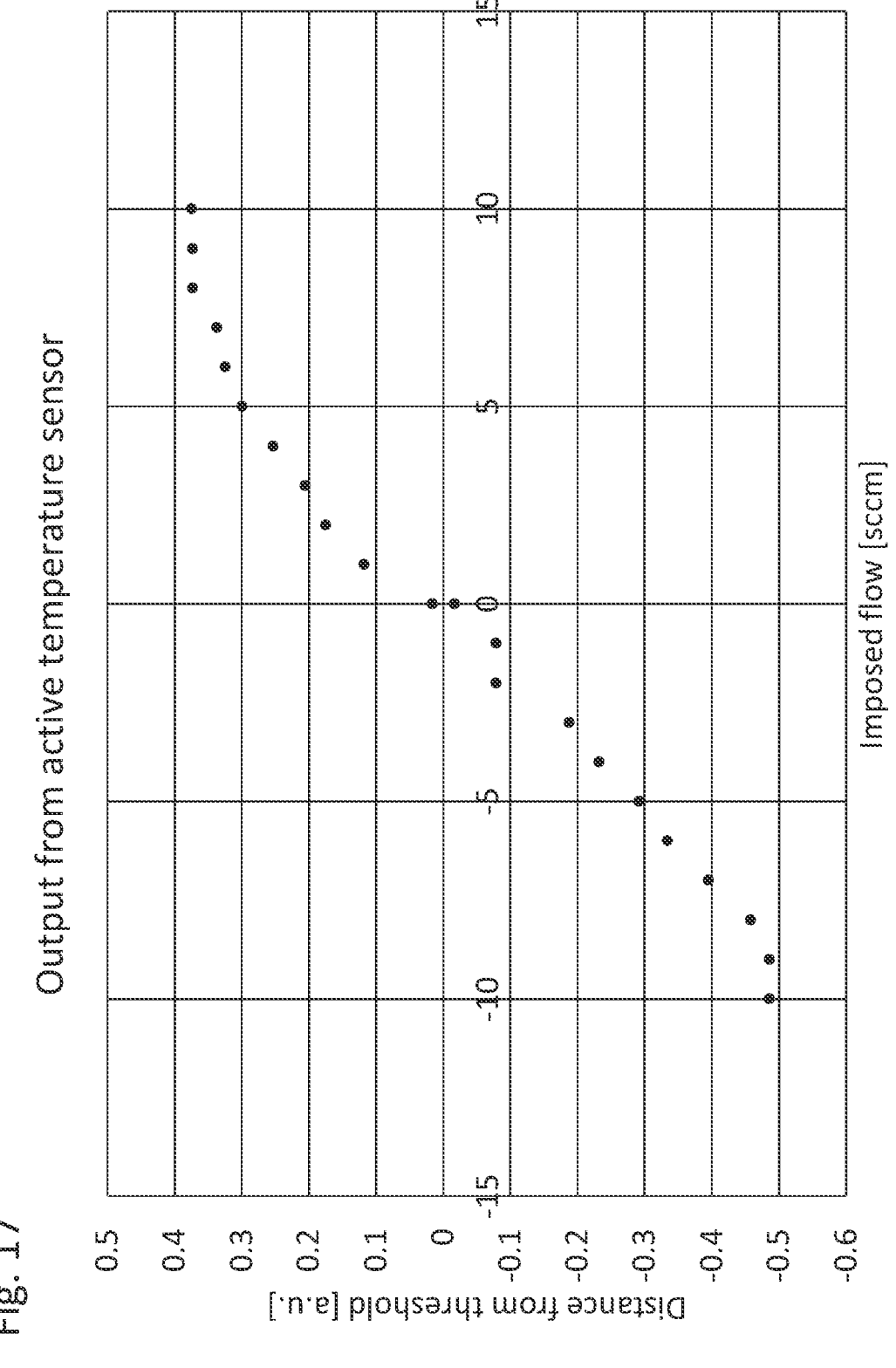
FIG. 17 shows an example of response from a device substantially similar to some sensors according to the present disclosure.

FIG. 17 shows an example of response from a device like the one described in this patent. The heater is biased in constant resistance to locally increase the temperature, and the signal from an active temperature sensor placed on the same dielectric membrane is stored as a threshold value. During operation, when the die is immersed in a flow, the sensor output is compared to the threshold, showing a good correlation between flow speed and direction of the flow.

FIG. 18 schematically illustrates a method 1800 for sensing direction of fluid-flow according to the present disclosure. The method 1800 may be carried out using a sensor according to one or more of the examples described in the present disclosure.

At step S1802 of the method 1800, a heating element is operated in a fluid-flow path. The fluid may flow, or be caused to flow (e.g. by placing the heating element in the fluid-flow path) past a heating element of the kind described herein.

At step S1804 of the method 1800, a signal corresponding to a first sensed temperature is received. The signal may be received, for example, via a first active temperature sensing element as described herein.

At step S1806 of the method 1800, a direction of fluid-flow is determined based on the first sensed temperature and a threshold value. The direction of fluid-flow may be determined by a processor as described herein.

Some or all of the steps, or parts of the steps, of the method 1800 may be implemented using software, firmware, hardware (e.g., fixed logic circuitry), or a combination of these implementations. In the case of a software implementation, one or more steps of the method may be stored as program code that performs specified tasks when executed on a processor (e.g. CPU or CPUs). The program code can be stored in one or more computer readable memory devices. The features of the techniques described herein are platform-independent, meaning that the techniques may be implemented on a variety of computing platforms.

FIG. 19 illustrates a method 1900 for manufacturing a sensor according to the present disclosure.

At step S1902 of the method 1900, a heating element is provided.

At step S1904 of the method 1900, a first active temperature sensing element is provided.

At step S1906 of the method 1900, the first active temperature sensing element is configured to sense a first sensed temperature. For example, the first active temperature sensing element may be disposed on a sensor (e.g. a substrate, dielectric layer, and/or dielectric membrane). In some examples, the first active temperature sensing element is not disposed on any kind of substrate or membrane and is instead floating in a fluid-flow path. The first active temperature sensing element is configured such that, in use, the temperature at the location of the first active temperature sensing element (i.e. the temperature sensed by the first active temperature sensing element, in use) is affected by heating of the heating element, and by the fluid-flow.

At step S1908 of the method 1900, a processor is provided.

At step S1910 of the method 1900, the processor is configured to receive a first signal corresponding to the first sensed temperature from the first active temperature sensing element, and to determine a direction of fluid-flow based on the first sensed temperature and a threshold value. Configuring the processor may comprise configuring the processor to receive instructions, e.g. programming code, to carry out the step S1912 of the method 1900. The first signal may comprise, for example, a voltage, a current, a power, and/or a temperature.

The skilled person will understand that in the preceding description and appended claims, positional terms such as 'above', 'overlap', 'under', 'lateral', etc. are made with reference to conceptual illustrations of a device, such as those showing standard cross-sectional perspectives and those shown in the appended drawings. These terms are used for ease of reference but are not intended to be of limiting nature. These terms are therefore to be understood as referring to a device when in an orientation as shown in the accompanying drawings.

Although the disclosure has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims.

Each feature disclosed or illustrated in the present specification may be incorporated in the disclosure, whether alone or in any appropriate combination with any other feature disclosed or illustrated herein.

REFERENCE NUMERALS

1 Semiconductor substrate
2 Dielectric membrane
3 Off membrane temperature sensing resistor
4 Heating element
5 First on membrane temperature sensing resistor
6 Second on membrane temperature sensing resistor
7 First thermopile
8 Second thermopile
9 Membrane holes
10 Package bottom part
11 Package walls
12 Package top and entry ports
13 dedicated microcontroller or ASIC
14 mounting PCB
20 Dielectric layer

The invention claimed is:

1. A sensor for sensing direction of fluid-flow, the sensor comprising:
a first resistor acting as a heating element;
a second resistor acting as a first active temperature sensing element, the first resistor and the second resistor being identical;
and a processor;
wherein the processor is configured to:
    receive a first signal corresponding to a first sensed temperature from the first active temperature sensing element; and
    determine a direction of fluid-flow based on the first signal corresponding to the first sensed temperature and a threshold value;
    receive a third signal from the heating element;
    determine a magnitude of fluid-flow based on a comparison between the third signal from the heating element and a calibration value, and
    periodically swap the first resistor and the second resistor so that the first resistor acts as the first active temperature sensing element and the second resistor acts as the heating element.

2. The sensor according to claim 1, wherein the processor is configured to determine the direction of fluid-flow based on a difference between the first sensed temperature and the threshold value.

3. The sensor according to claim 1, further comprising an ambient temperature sensing element, the ambient temperature sensing element being configured to detect an ambient temperature;
wherein the processor is further configured to determine the threshold value based on the ambient temperature.

4. The sensor according to claim 3, wherein the ambient temperature sensing element is thermally decoupled from the heating element.

5. The sensor according to claim 3, wherein the processor is configured to determine the threshold value based further on a signal from the heating element.

6. The sensor according to claim 1, further comprising: a semiconductor substrate comprising an etched portion; and
a dielectric region located on the semiconductor substrate, wherein the dielectric region comprises a dielectric membrane located over the etched portion of the semiconductor substrate;

wherein the heating element is located within the dielectric membrane.

7. The sensor according to claim 6, wherein the first active temperature sensing element is located on or within the dielectric membrane, and wherein the first active temperature sensing element is spatially separated from the heating element.

8. The sensor according to claim 6, wherein an ambient temperature sensing element is located outside of the dielectric membrane.

9. The sensor according to claim 6, wherein an ambient temperature sensing element is located within the dielectric membrane, and wherein the ambient temperature sensing element is thermally isolated from the heating element.

10. The sensor according to claim 9, wherein the ambient temperature sensing element is thermally isolated from the heating element by one or more recessed regions of the dielectric membrane.

11. The sensor according to claim 1, further comprising a second active temperature sensing element, wherein the processor is further configured to:

receive a second signal corresponding to a second sensed temperature from the second active temperature sensing element; and determine the direction of fluid-flow based additionally on the second signal corresponding to the second sensed temperature.

12. The sensor according to claim 11, wherein the processor is further configured to determine the direction of fluid-flow based on a difference between the second signal and a second threshold value.

13. The sensor according to claim 12, wherein the first active temperature sensing element and the second active temperature sensing element are located at different distances from the heating element.

14. The sensor according to claim 11, wherein the first active temperature sensing element and the second active temperature sensing element are located at substantially the same distance from the heating element, and wherein the processor is further configured to:

determine a difference between the first and second sensed temperatures; and determine the direction of fluid-flow based on a difference between:

the difference between the first and second sensed temperatures; and the threshold value.

15. A method for sensing direction of fluid-flow, the method comprising:

operating a heating element in a fluid-flow path;

receiving a first signal corresponding to a first sensed temperature from an active temperature sensing element;

determining a direction of fluid-flow based on the first sensed temperature and a threshold value;

receiving a third signal from the heating element;

determining a magnitude of fluid-flow based on a comparison between the third signal from the heating element and a calibration value, and periodically swapping the roles of the heating element and of the active temperature sensing element.

16. The method according to claim 15, further comprising:

determining an ambient temperature; and determining the threshold value based on the ambient temperature.

17. The method according to claim 16, comprising determining the threshold value based further on a signal from the heating element.

18. The method according to claim 15, further comprising:

determining a second sensed temperature; and determining the direction of fluid-flow based additionally on the second sensed temperature.

19. A method of manufacturing a sensor for sensing direction of fluid-flow, the method comprising:

providing a first resistor configured to act as heating element;

providing a second resistor configured to act as first active temperature sensing element, the first resistor and the second resistor being identical;

configuring the first active temperature sensing element to sense a first sensed temperature;

providing a processor; and configuring the processor to receive a first signal corresponding to the first sensed temperature from the first active temperature sensing element to determine a direction of fluid-flow based on the first sensed temperature and a threshold value; to receive a third signal from the heating element; to determine a magnitude of fluid-flow based on a comparison between the third signal from the heating element and a calibration value, and periodically swap the first resistor and the second resistor so that the first resistor is configured to act as the first active temperature sensing element and the second resistor is configured to act as the heating element.

* * * * *